(12) United States Patent
Lee

(10) Patent No.: US 10,620,749 B2
(45) Date of Patent: Apr. 14, 2020

(54) DISPLAY DEVICE HAVING EMBEDDED TOUCH SCREEN AND METHOD FOR DETECTING TOUCH TO PREVENT A SIGNAL LINE FROM BEING OBSERVED AND REMOVE AN INFLUENCE OF A TOUCH SENSOR

(71) Applicant: G2TOUCH Co., LTD, Seongnam (KR)

(72) Inventor: Sung Ho Lee, Hwaseong (KR)

(73) Assignee: G2TOUCH Co., LTD, Seongnam (KR)

( * ) Notice: Subject to any disclaimer, the term of this patent is extended or adjusted under 35 U.S.C. 154(b) by 65 days.

(21) Appl. No.: 15/375,067

(22) Filed: Dec. 9, 2016

(65) Prior Publication Data

US 2017/0168642 A1 Jun. 15, 2017

(30) Foreign Application Priority Data

Dec. 11, 2015 (KR) .................. 10-2015-0176960

(51) Int. Cl.
*G06F 3/044* (2006.01)
*G06F 3/041* (2006.01)
*G06F 3/047* (2006.01)
*G02F 1/1333* (2006.01)
*G02F 1/1343* (2006.01)

(52) U.S. Cl.
CPC ........ *G06F 3/0418* (2013.01); *G02F 1/13338* (2013.01); *G02F 1/13439* (2013.01); *G02F 1/133345* (2013.01); *G02F 1/134309* (2013.01); *G06F 3/044* (2013.01); *G06F 3/047* (2013.01); *G06F 3/0412* (2013.01); *G06F 3/0416* (2013.01); *G02F 2201/121* (2013.01); *G02F 2201/123* (2013.01); *G06F 2203/04103* (2013.01); *G06F 2203/04107* (2013.01); *G06F 2203/04112* (2013.01)

(58) Field of Classification Search
CPC ........ G06F 3/0412; G06F 3/044; G06F 3/041; G06F 3/0416; G02F 1/13394
See application file for complete search history.

(56) References Cited

U.S. PATENT DOCUMENTS

| | | | | |
|---|---|---|---|---|
| 2008/0309627 A1* | 12/2008 | Hotelling | .......... | G02F 1/134363 345/173 |
| 2012/0038585 A1* | 2/2012 | Kim | .......... | G06F 3/0412 345/174 |
| 2012/0044171 A1* | 2/2012 | Lee | .......... | G06F 3/0412 345/173 |
| 2012/0218199 A1* | 8/2012 | Kim | .......... | G06F 3/0412 345/173 |
| 2013/0321296 A1* | 12/2013 | Lee | .......... | G09G 3/3674 345/173 |

(Continued)

*Primary Examiner* — Jennifer Mehmood
*Assistant Examiner* — James S Nokham

(57) ABSTRACT

Disclosed herein are a display device having an embedded touch screen and a method for detecting a touch, and more particularly, a display device having an embedded touch screen capable of preventing deterioration of image quality generated in the display device when a touch sensor and a sensor signal line are disposed in the display device and solving a problem that sensitivity of a detected touch signal is weakened due to a parasitic capacitance generated between the touch sensor and the sensor signal line and a signal line and components of the display device, and a method for detecting a touch.

20 Claims, 23 Drawing Sheets

(56) References Cited

U.S. PATENT DOCUMENTS

| | | | |
|---|---|---|---|
| 2013/0335376 A1* | 12/2013 | Lee | G06F 3/0416 345/174 |
| 2014/0104222 A1* | 4/2014 | Chang | G06F 3/044 345/174 |
| 2014/0168539 A1* | 6/2014 | Kim | G06F 3/041 349/12 |
| 2014/0362000 A1* | 12/2014 | Seo | G02F 1/13394 345/173 |
| 2015/0035766 A1* | 2/2015 | Chung | G06F 3/0412 345/173 |
| 2016/0195957 A1* | 7/2016 | Reynolds | G06F 3/0412 345/174 |
| 2017/0160845 A1* | 6/2017 | Lee | G06F 3/0412 |

\* cited by examiner

[FIG. 1]
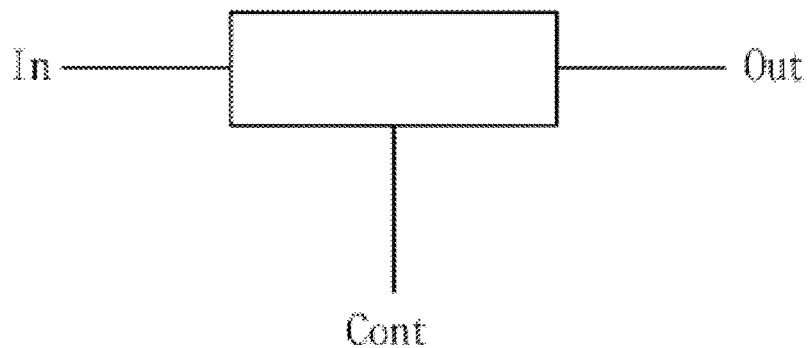
[FIG. 2]
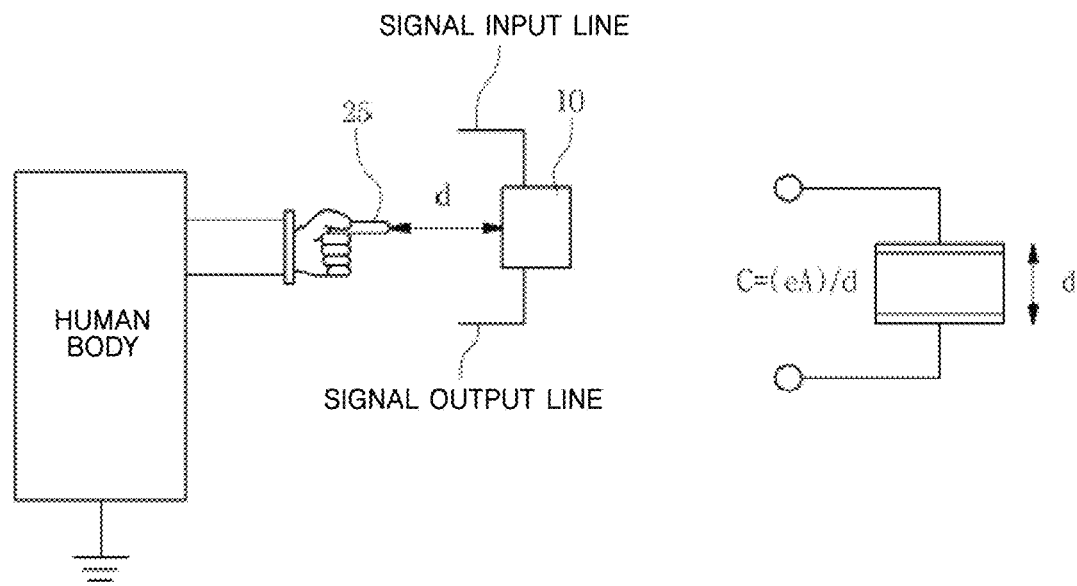

[FIG. 3]
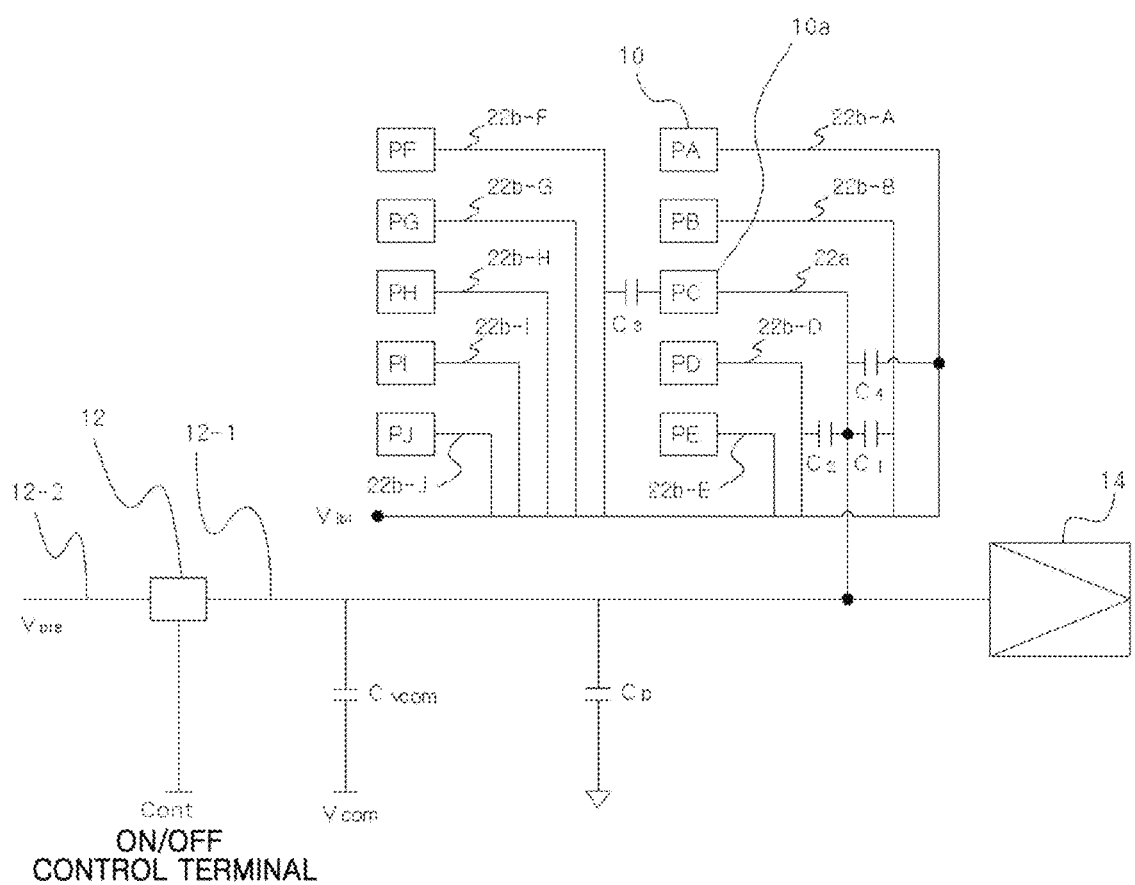

[FIG. 4]
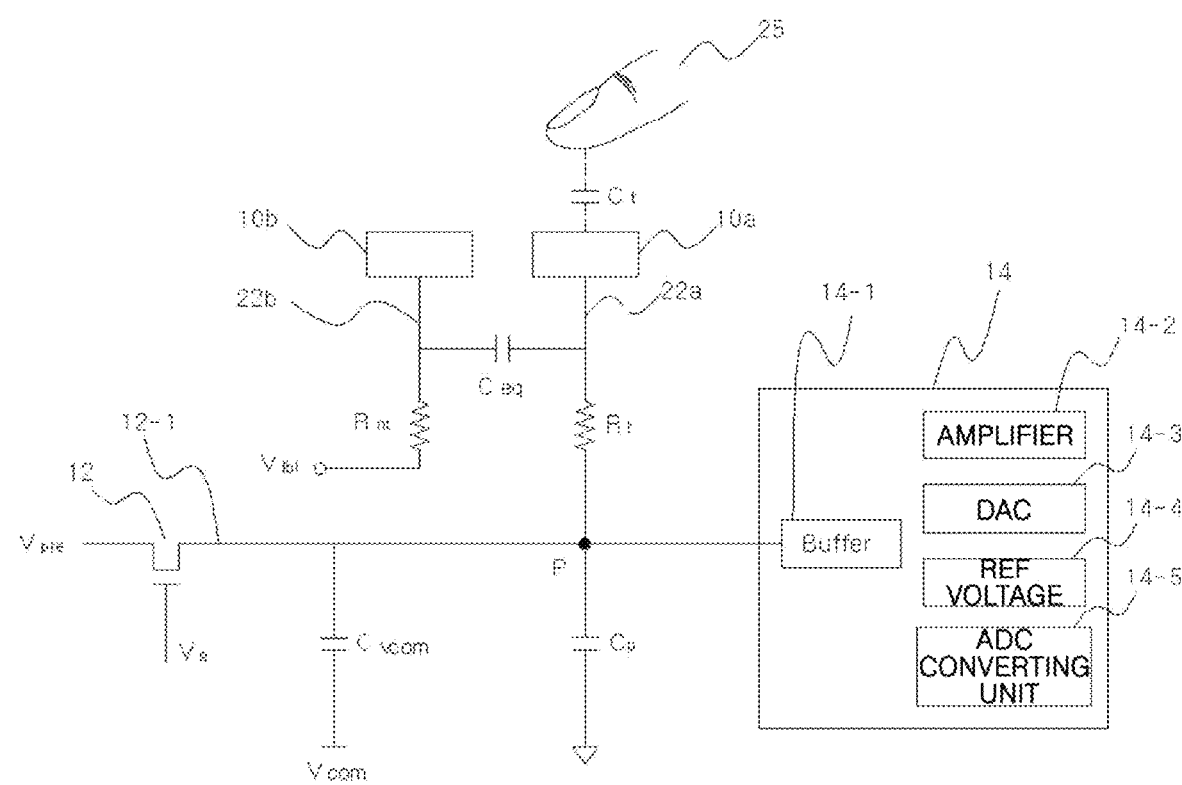

[FIG. 5]
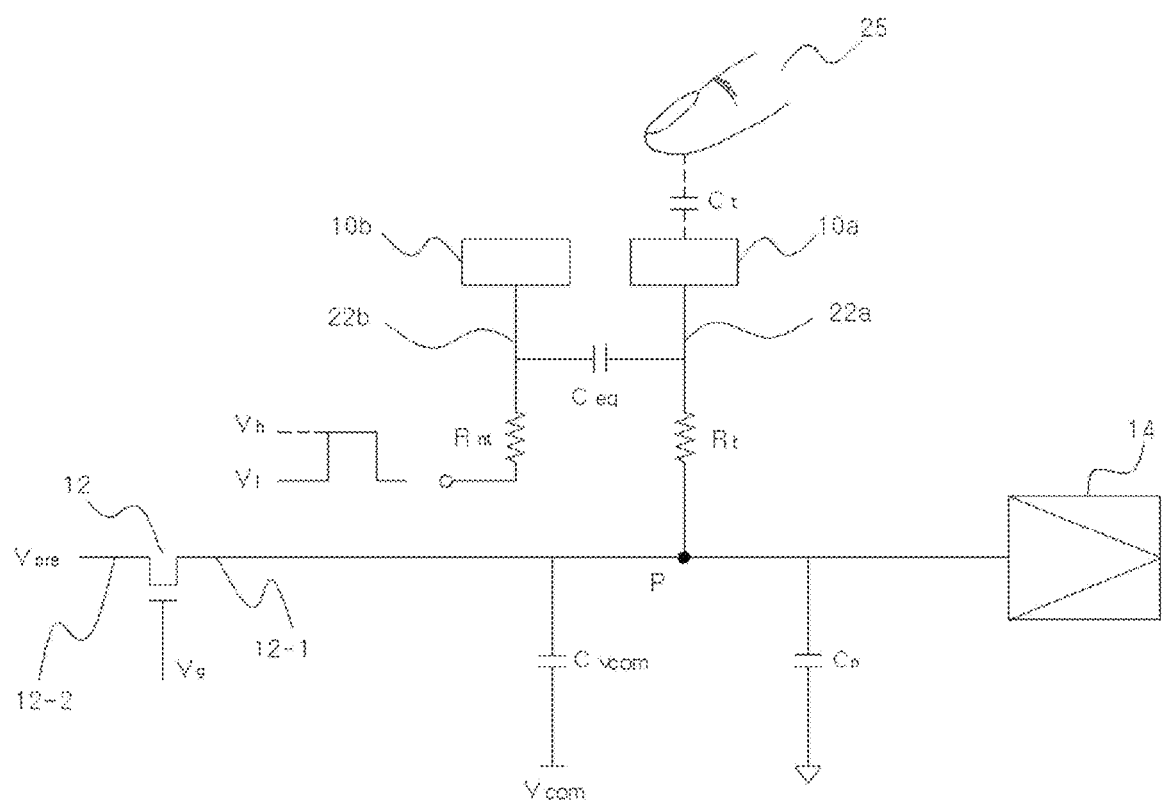

[FIG. 6]
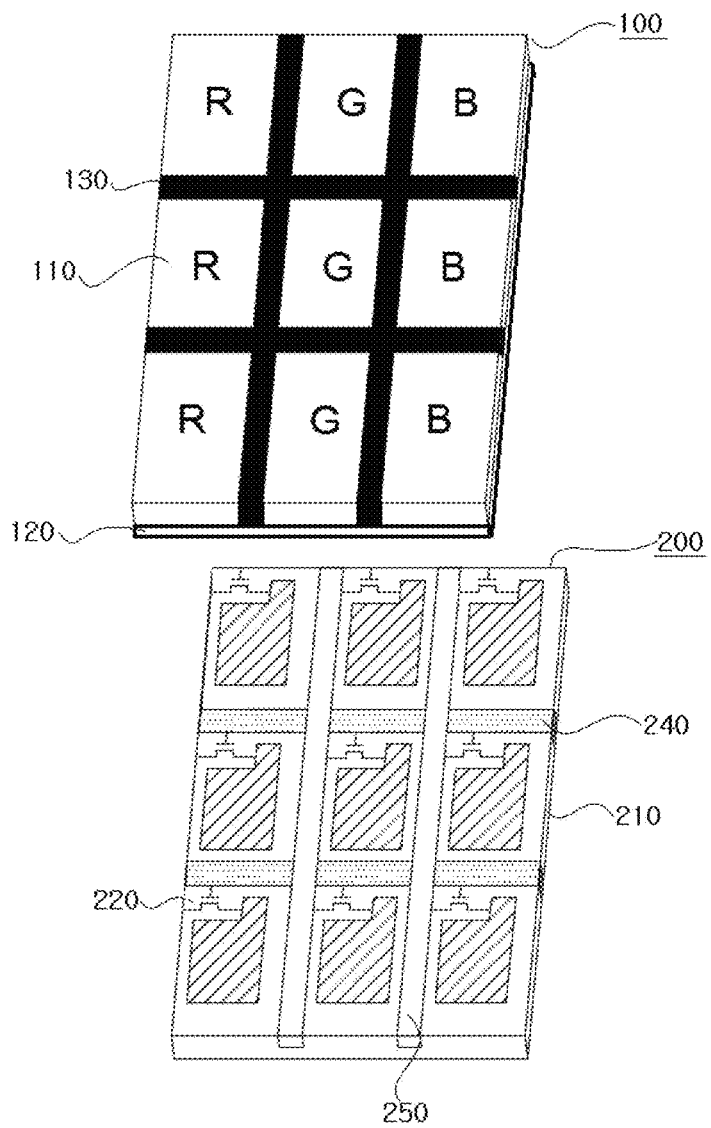

[FIG. 7]
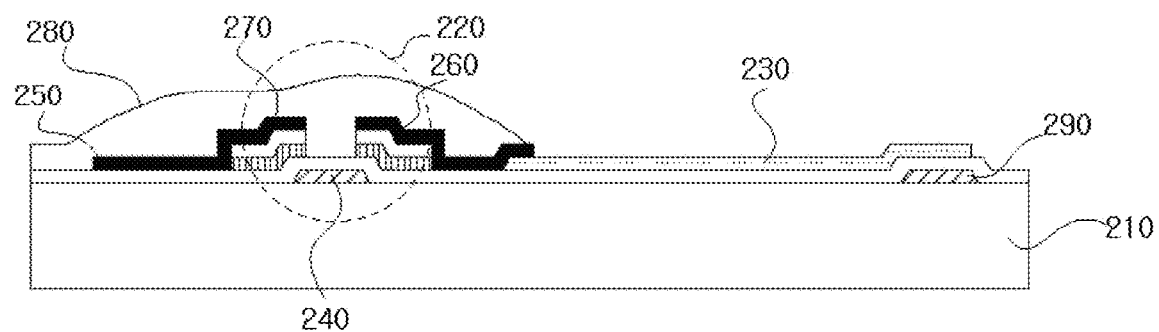
[FIG. 8]
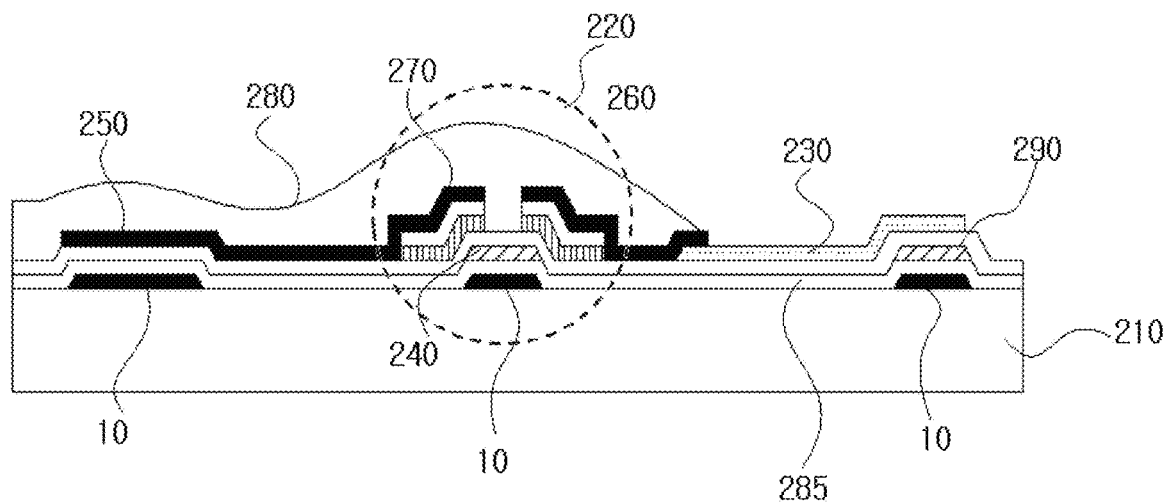

[FIG. 9]
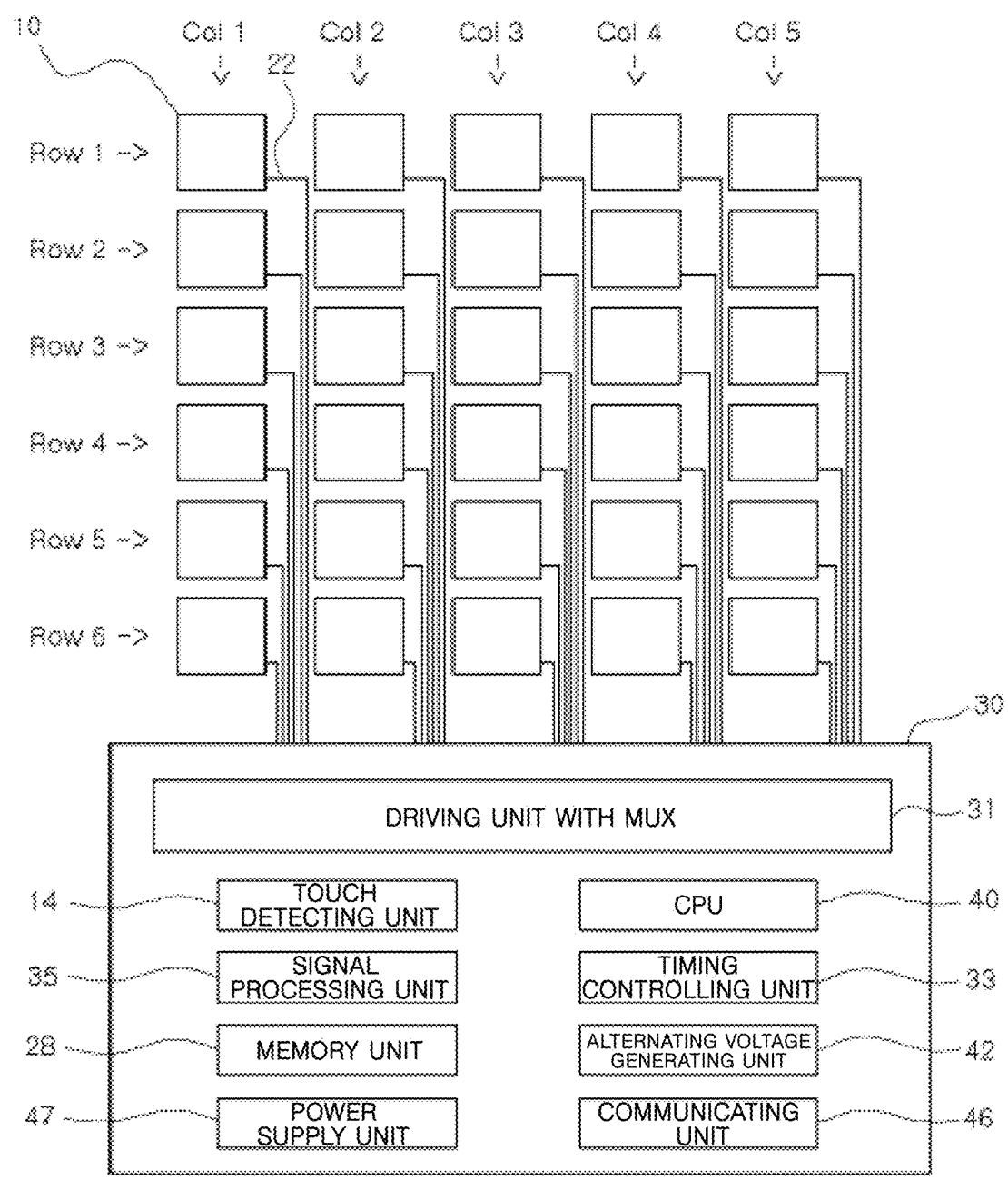

[FIG. 10]
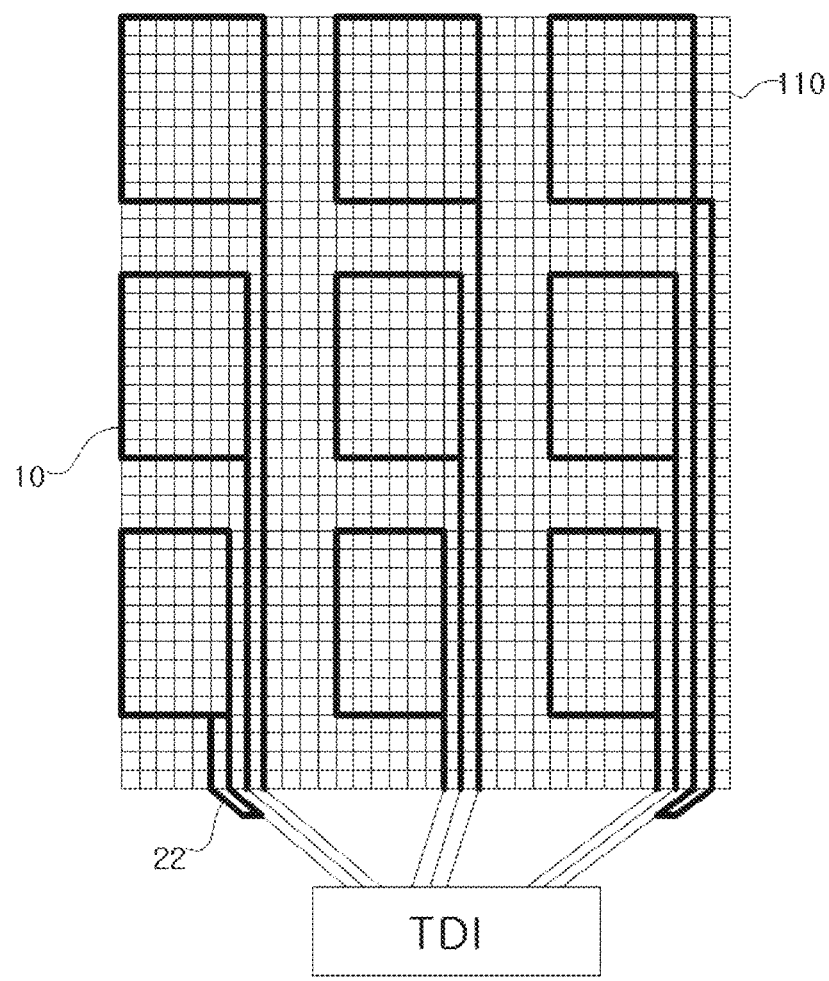

[FIG. 11]
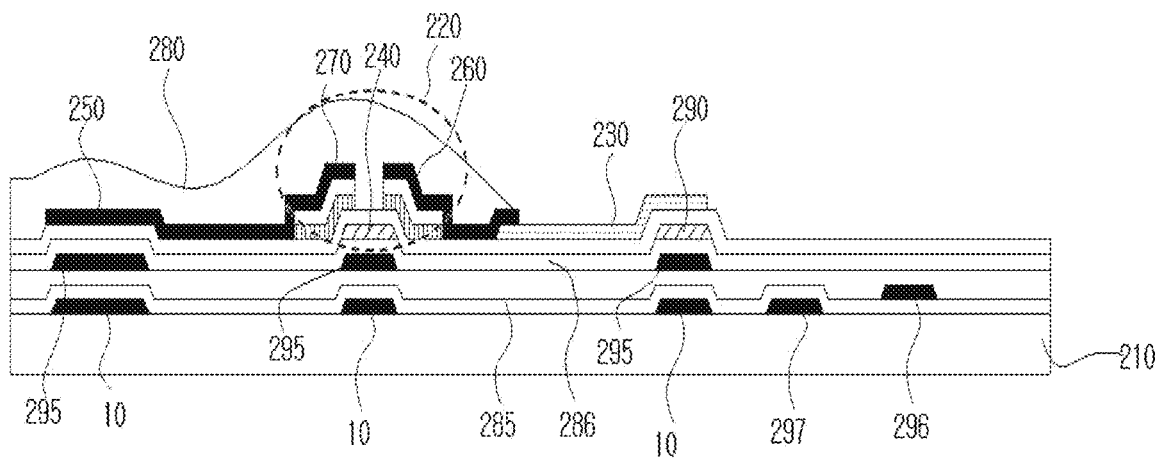
[FIG. 12]
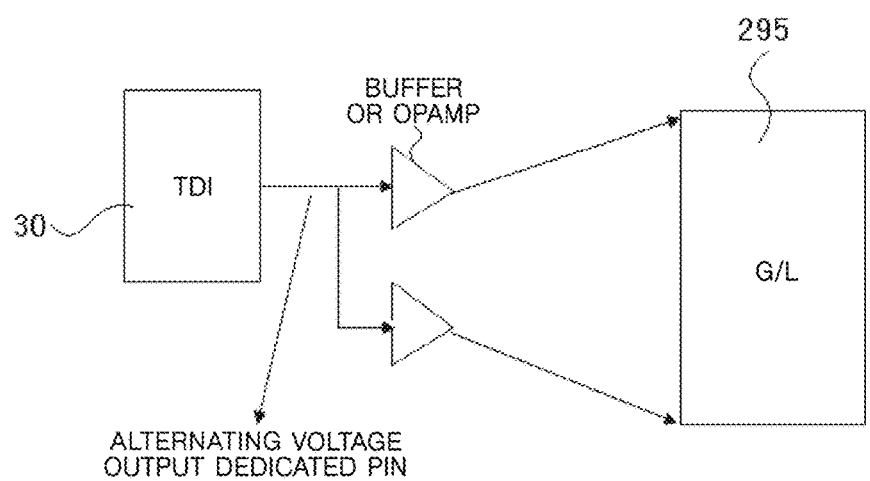

[FIG. 13]
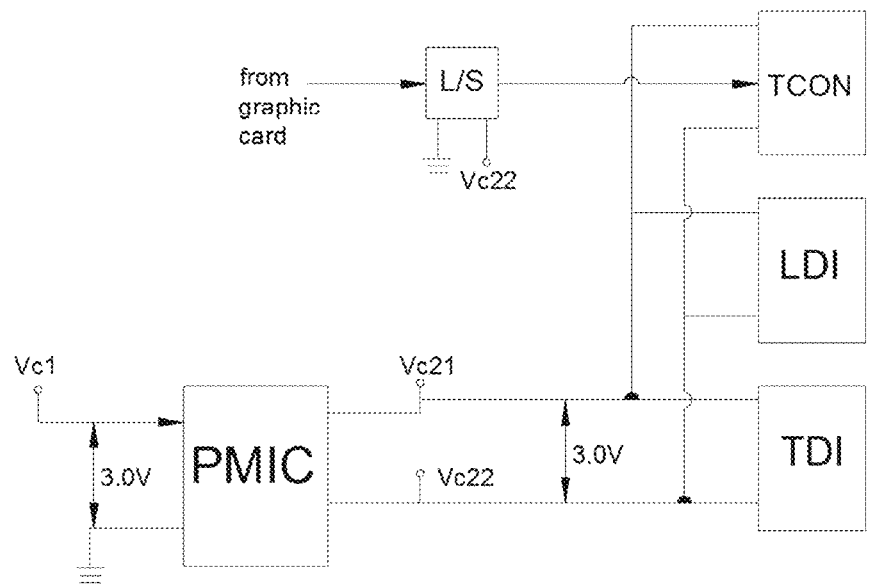
[FIG. 14]
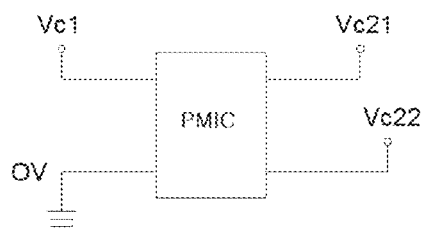
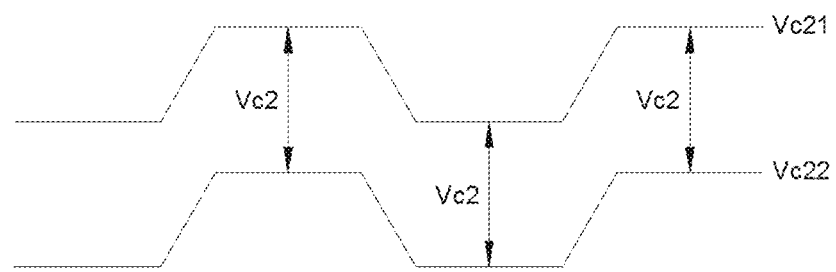

[FIG. 15]
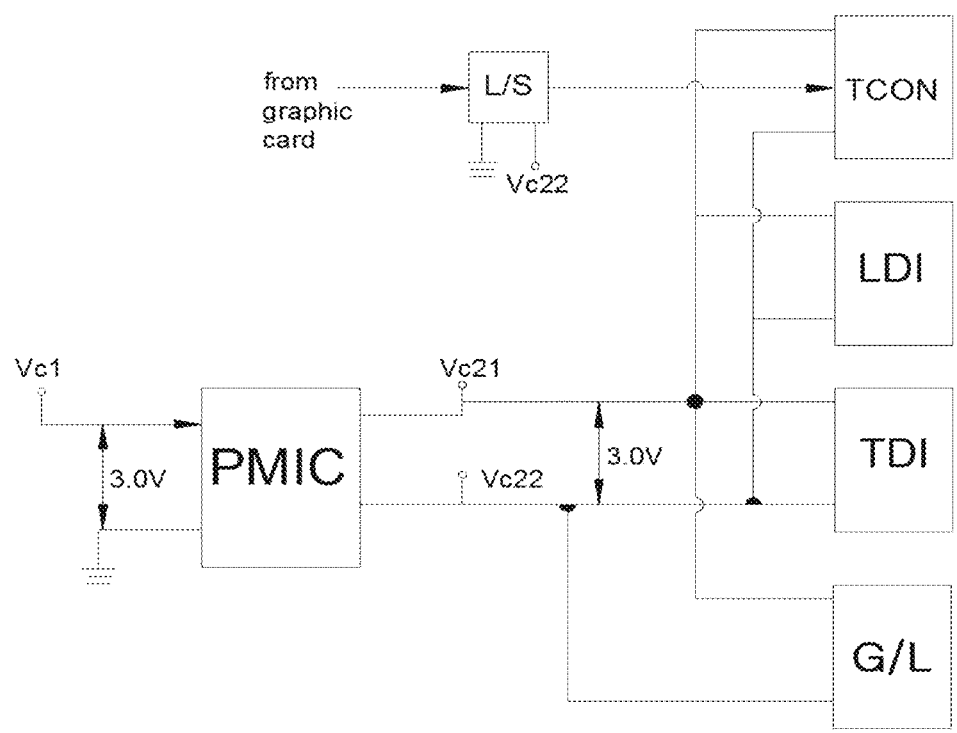

[FIG. 16]
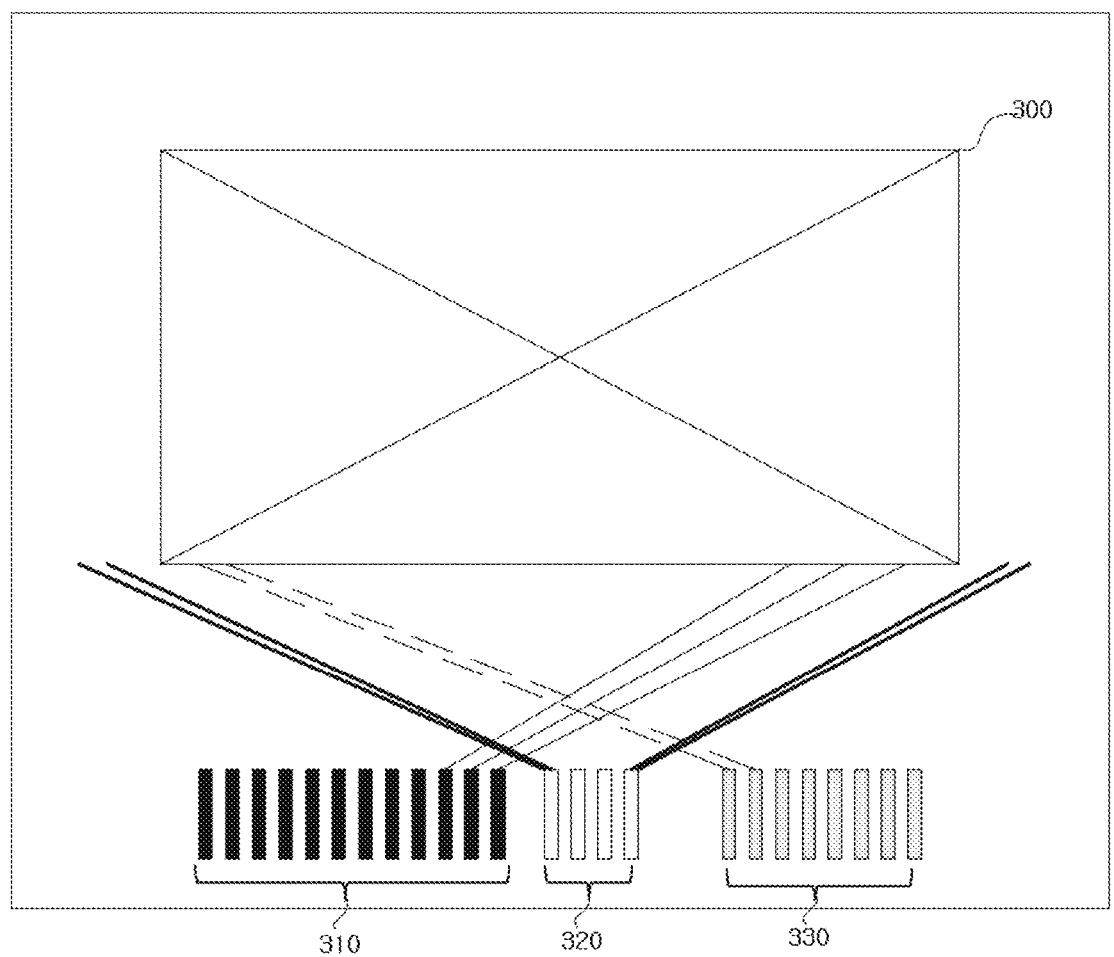

[FIG. 17]
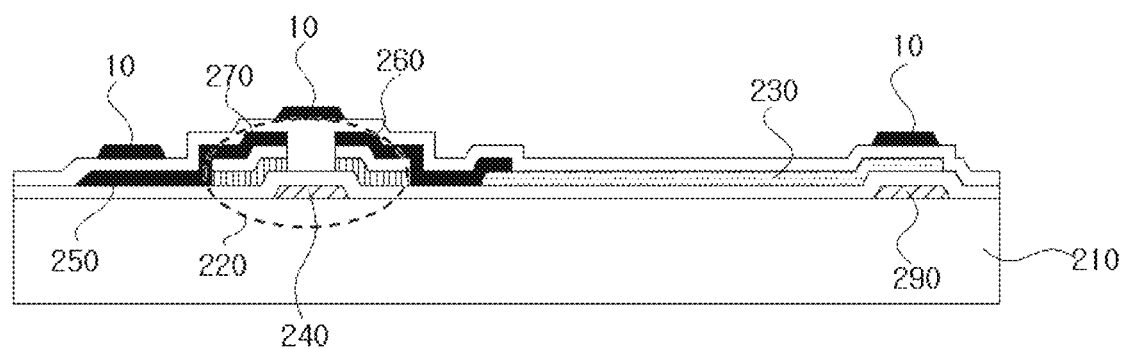
[FIG. 18]
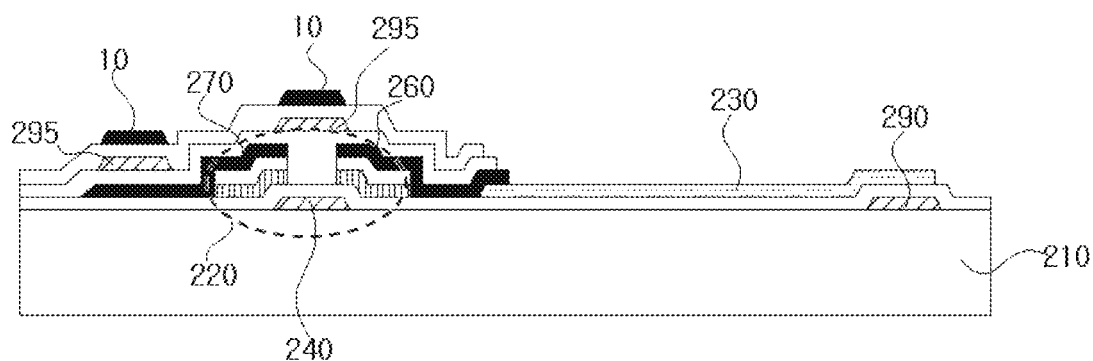

[FIG. 19]
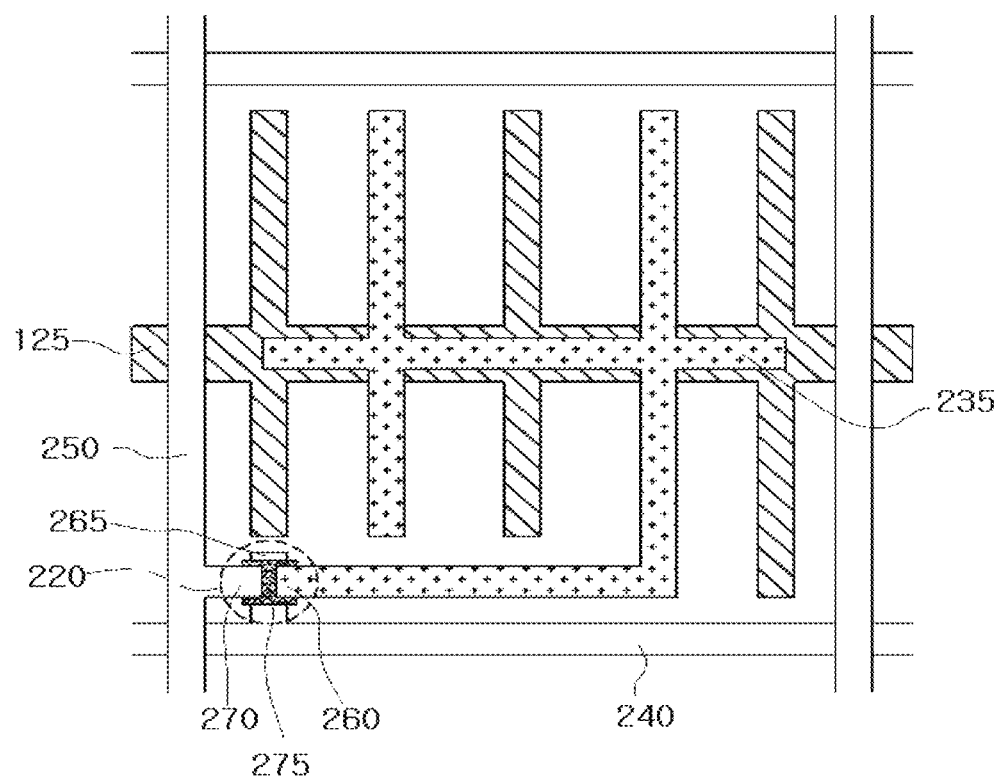

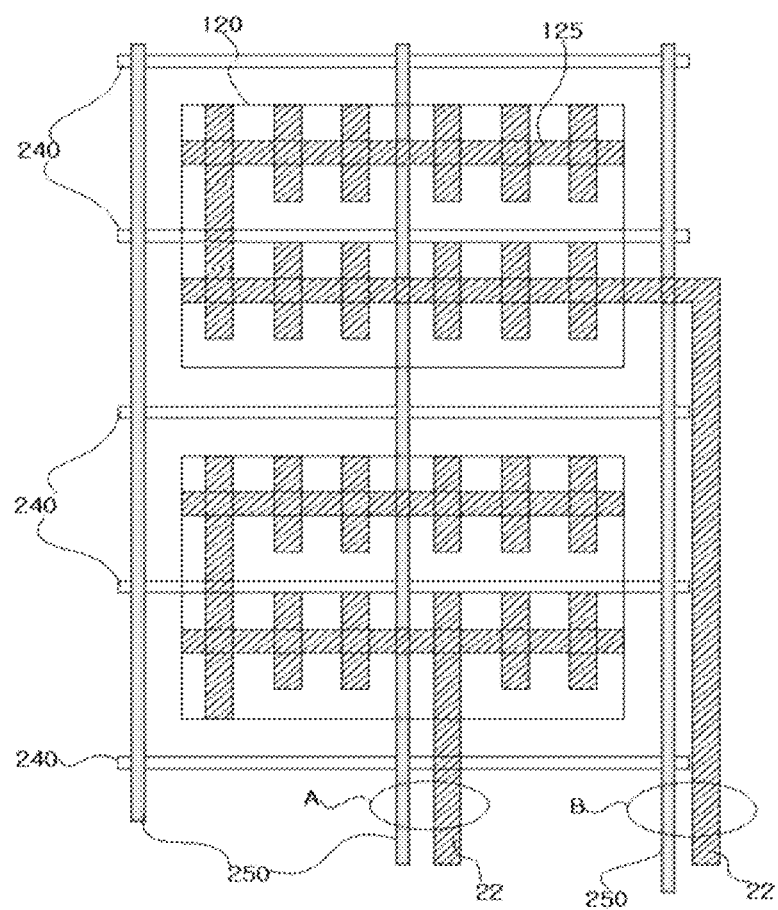
[FIG. 20]

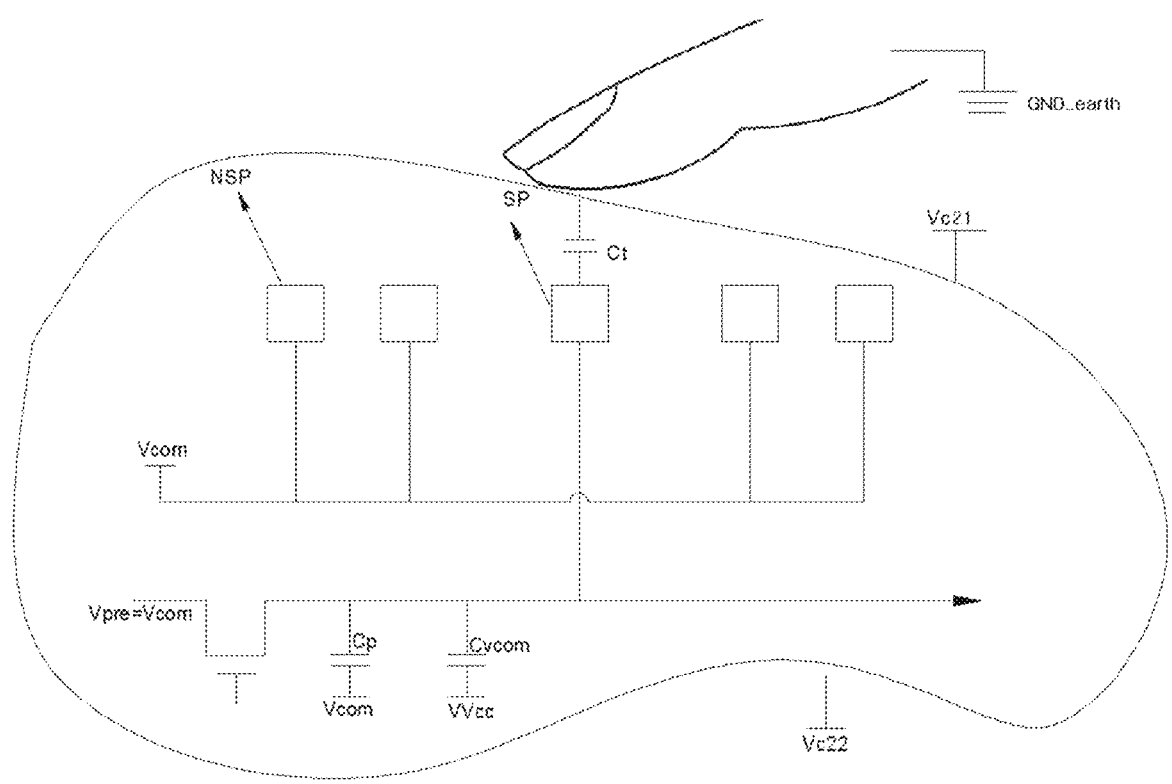
[FIG. 21]

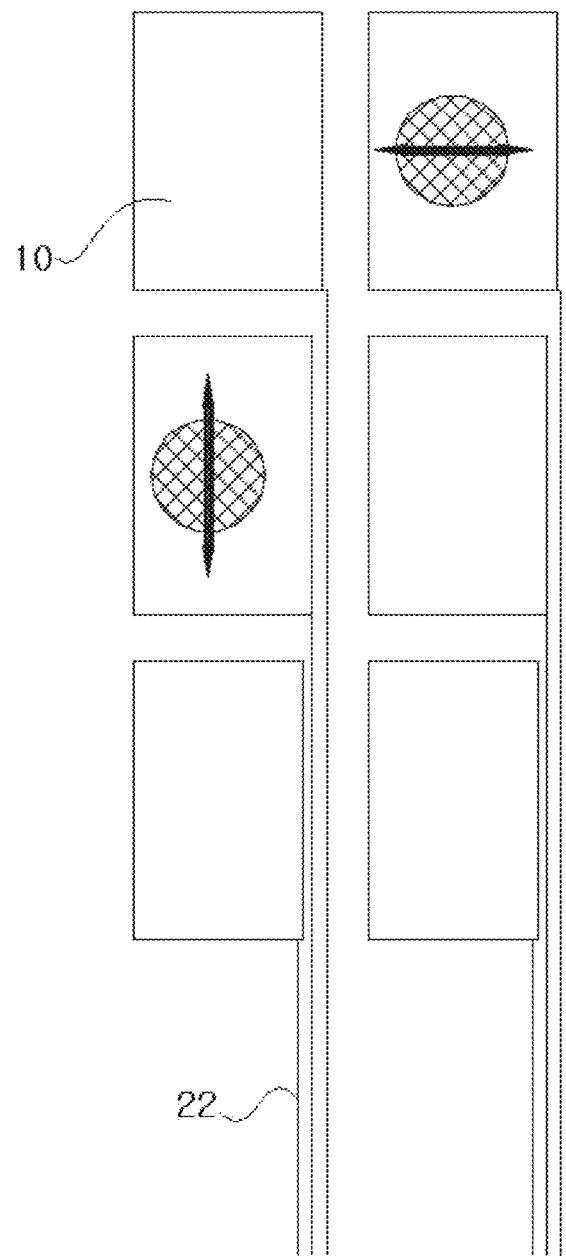

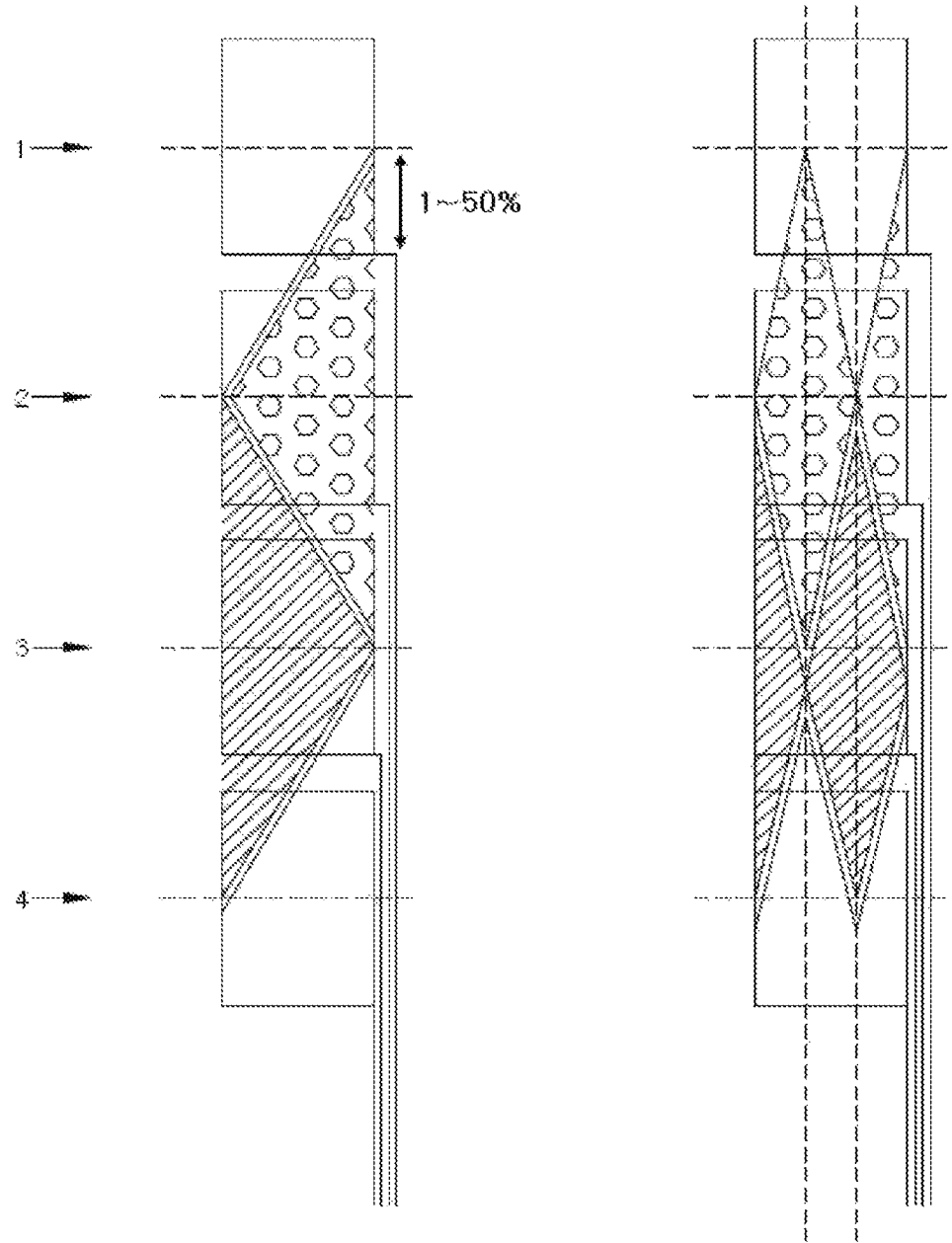
[FIG. 23A]　　　　　　　　[FIG. 23B]

[FIG. 24]
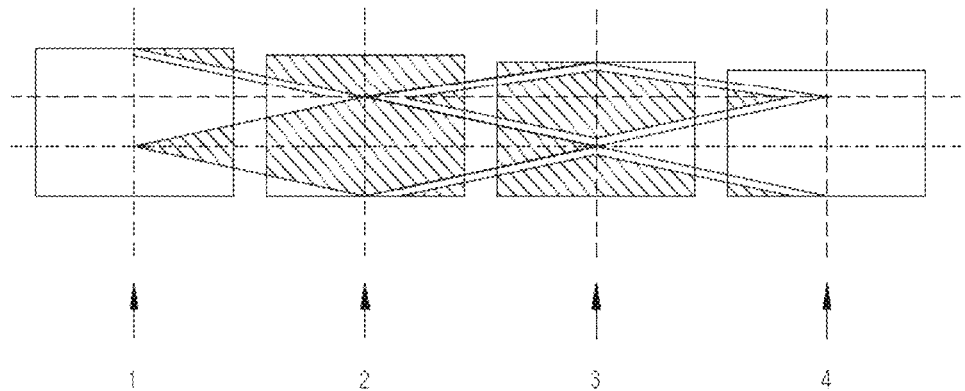
[FIG. 25]
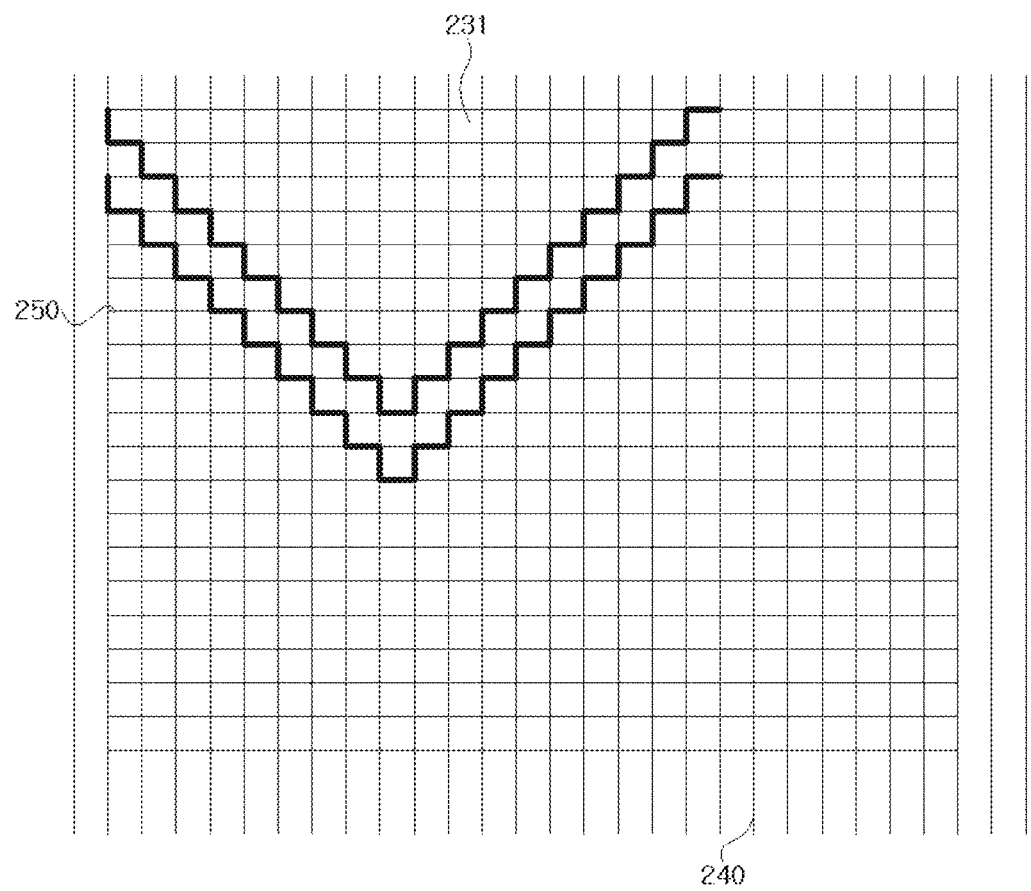

[FIG. 26]
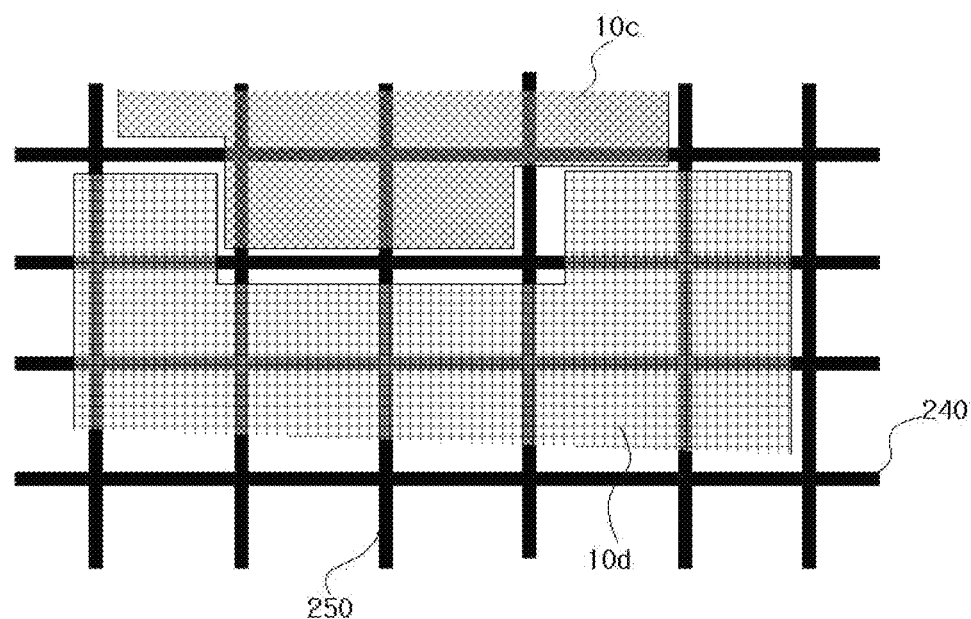
[FIG. 27]
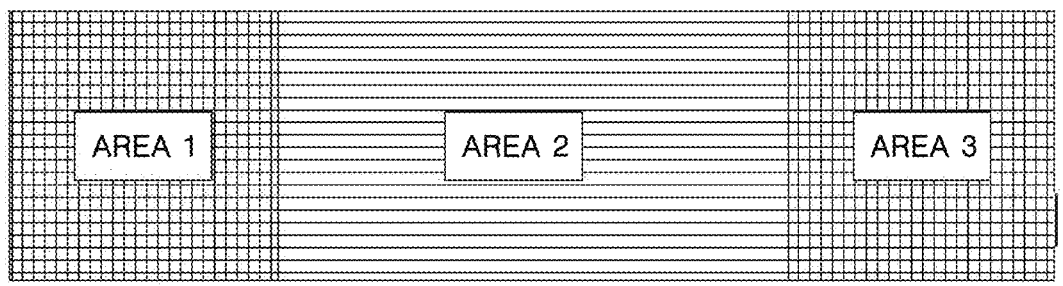

[FIG. 28]
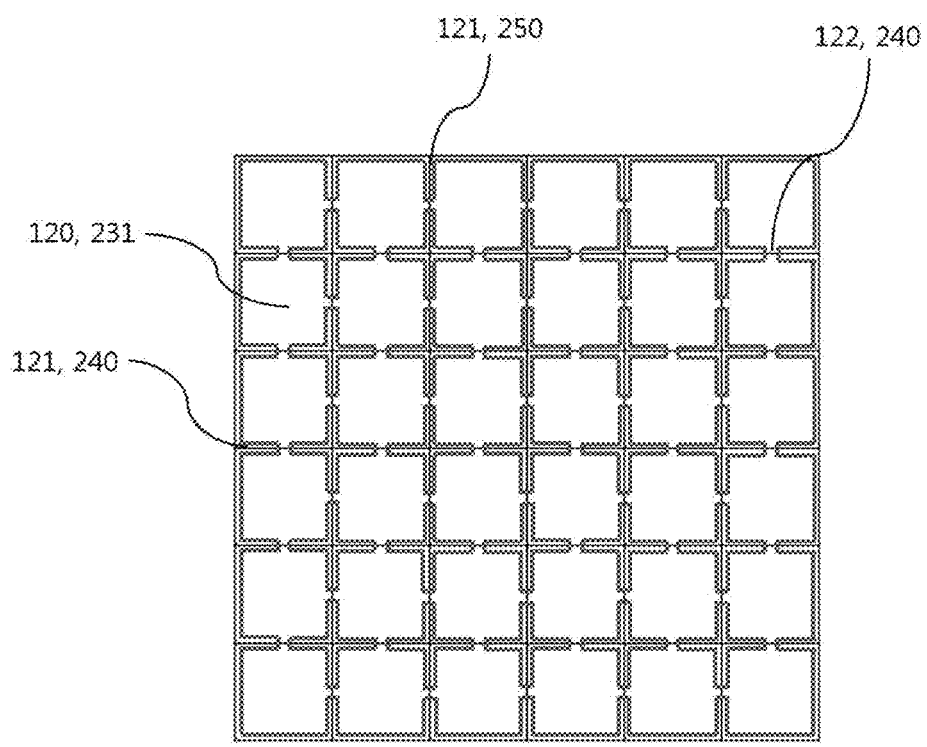

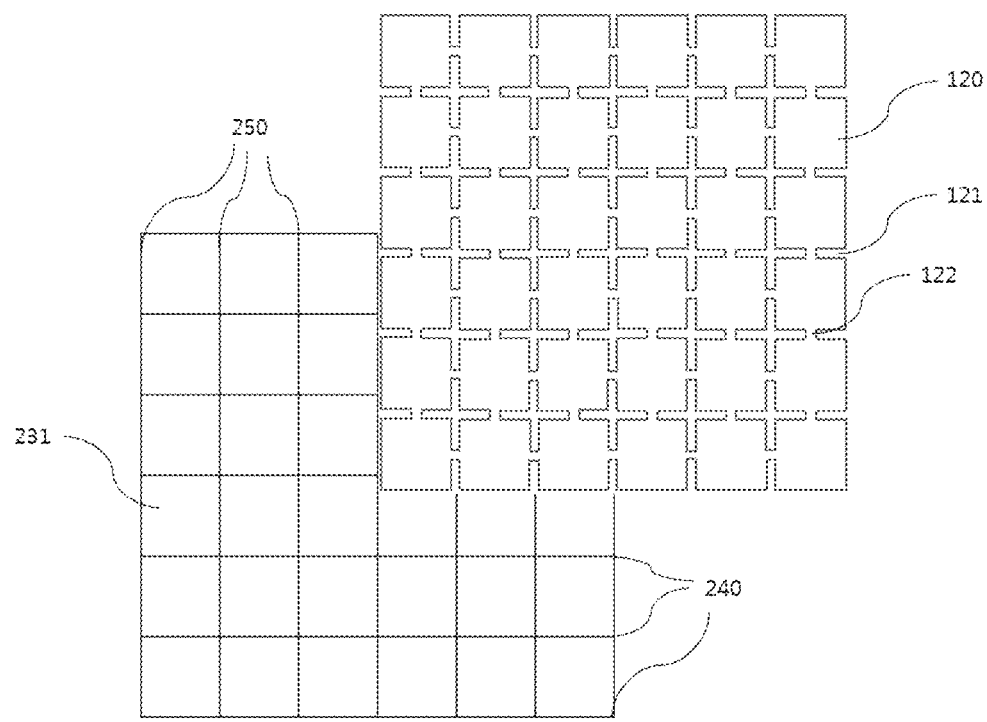
[FIG. 29]

[FIG. 30]
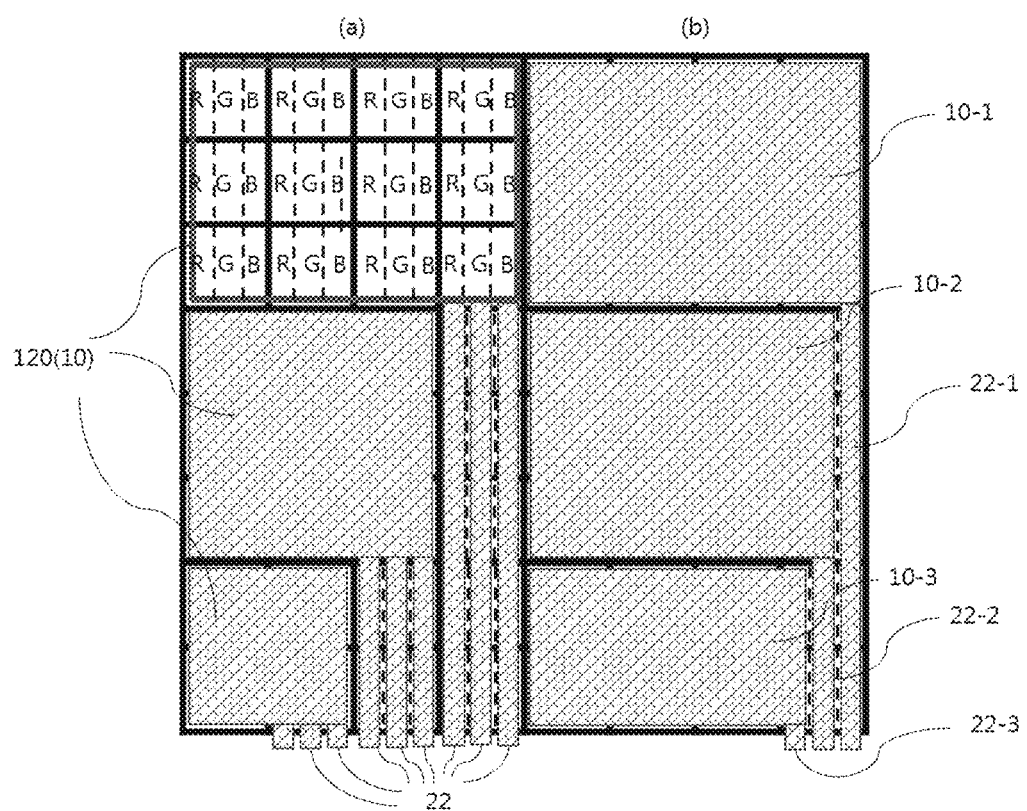

DISPLAY DEVICE HAVING EMBEDDED TOUCH SCREEN AND METHOD FOR DETECTING TOUCH TO PREVENT A SIGNAL LINE FROM BEING OBSERVED AND REMOVE AN INFLUENCE OF A TOUCH SENSOR

CROSS-REFERENCE TO RELATED APPLICATIONS

This application claims priority from and the benefit of Korean Patent Application No. 10-2015-0176960, filed on Dec. 11, 2015, which is hereby incorporated by reference for all purposes as if fully set forth herein.

BACKGROUND

Field

The present disclosure relates to a display device having an embedded touch screen and a method for detecting a touch.

Discussion of the Background

Generally, a touch screen, which is an input device added on display devices such as a liquid crystal display (LCD), a plasma display panel (PDP), an organic light emitting diode (OLED), an active matrix organic light emitting diode (AMOLED), and the like, or embedded in the display device, is a device recognizing an object such as a finger, a touch pen, or the like, contacting the touch screen as an input signal. A touch input device has been recently mounted mainly in mobile apparatuses such as a mobile phone, a personal digital assistants (PDA), a portable multimedia player (PMP), and the like, and has also been used in all industrial fields such as a navigation device, a netbook computer, a laptop computer, a digital information device, a desktop computer supplying a touch input supporting operating system, an Internet protocol television (IPTV), a state-of-the-art fighter, a tank, an armored motorcar, and the like.

A display device in which the touch screen described above is used may be divided into a touch screen add-on type display device, a touch screen on-cell type display device, and a touch screen in-cell type display device depending on a structure thereof. The touch screen add-on type display device is manufactured by individually manufacturing a display device and a touch screen and then adding the touch screen on an upper plate of the display device, has a thick thickness, and has low brightness to have low visibility. The touch screen on-cell type display device is manufactured by directly forming elements constituting a touch screen on an upper substrate of a display device (a color filter of an LCD or a sealing substrate of an OLDE), and may have a thickness reduced as compared with the touch screen add-on type display device, but may not be manufactured in an existing process of manufacturing an LCD, such that additional equipment investment is required or a manufacturing cost is increased at the time of manufacturing the touch screen on-cell type display device using an existing equipment.

On the other hand, the touch screen in-cell type display device may be manufactured without an additional investment in equipment in a process of manufacturing a display device such as an LCD, an OLED, or the like, such that a manufacturing cost is reduced, and a high performance display device manufacturing equipment may be used. Therefore, a yield is increased, such that the manufacturing cost is further reduced.

However, in the touch screen in-cell type display device according to the related art, touch sensors and sensor signals lines generate interference with driving signal lines of the display device to cause deterioration of image quality of the display device, such that the touch sensors and the sensor signal lines are viewed, and in the case in which the sensor signal lines are disconnected, performance of the touch screen is deteriorated.

In addition, in the case in which the touch screen is embedded in the LCD, when pixel electrodes or source lines or gate lines of the LCD and the touch sensors or the sensor signal lines overlap with each other in a vertical or horizontal direction, a physical parasitic capacitance is generated, and a magnitude of the parasitic capacitance is significantly large, such that due to the parasitic capacitance, touch sensitivity is deteriorated or touch signals may not be detected in an extreme case.

BRIEF SUMMARY OF THE INVENTION

The present invention has been suggested in order to solve the problems in the related art as described above, and an object of the present invention is to form a touch sensor and a sensor signal line so as to be positioned above or below (or on the same line as) a driving signal line (a source line, a gate line, or the like) of a display device to prevent a signal line from being observed in the display device and remove an influence of the touch sensor and the sensor signal line on the display device, thereby preventing a malfunction of the display device.

According to an exemplary embodiment of the present invention, A display device having an embedded touch screen, the display device including a substrate on which pixel electrodes, driving signal lines, and common electrodes are disposed, wherein the common electrodes are disposed above or below the pixel electrodes, comprising: touch sensors configured by electrically connecting one or more common electrodes to each other.

The display device further comprising sensor signal lines electrically connecting the touch sensors configured by electrically connecting one or more common electrodes to each other to a touch drive IC.

The sensor signal lines are configured by electrically connecting one or more common electrodes to each other.

The sensor signal lines are formed of a transparent conductive material or an opaque metal material, and are disposed on the same lines which are perpendicular to the driving signal lines.

The touch drive IC drives the touch sensors configured by electrically connecting one or more common electrodes, during a poach period of the pixel electrodes.

The common electrodes are disposed above the pixel electrode, and an insulating layer is disposed between the common electrodes and the pixel electrodes.

A guard layer is disposed between the common electrodes and the pixel electrodes.

The guard layer is divided to be overlapped with the touch sensors configured by electrically connecting one or more common electrodes in one-to-one scheme.

Among the touch sensors configured by electrically connecting one or more common electrodes, the guard layer overlapped with a first touch sensor detecting a touch is applied with a first voltage, and the guard layer overlapped with a second touch sensor that does not detect the touch is applied with a second voltage.

The first voltage is an alternating voltage or a precharge voltage, the second voltage is a DC voltage or a ground voltage, and the first voltage and the second voltage are supplied from a touch drive IC or a power management IC.

According to still another exemplary embodiment of the present invention, A method for detecting a touch of a display device having an embedded touch screen, the display device including a substrate on which pixel electrodes, driving signal lines, and common electrodes are disposed, wherein the common electrodes are disposed over or below the pixel electrodes, comprising: generating touch signals by touch sensors configured by electrically connecting one or more common electrodes to each other; and detecting the touch by receiving the generated touch signals through sensor signal lines.

The sensor signal lines electrically connect the touch sensors configured by electrically connecting one or more common electrodes to each other to a touch drive IC.

The sensor signal lines are configured by electrically connecting one or more common electrodes to each other.

The sensor signal lines are formed of a transparent conductive material or an opaque metal material, and are disposed on the same lines which are perpendicular to the driving signal lines.

The touch drive IC drives the touch sensors configured by electrically connecting one or more common electrodes, during a poach period of the pixel electrodes.

The common electrodes are disposed above the pixel electrode, and an insulating layer is disposed between the common electrodes and the pixel electrodes.

A guard layer is disposed between the common electrodes and the pixel electrodes.

The guard layer is divided to be overlapped with the touch sensors configured by electrically connecting one or more common electrodes in one-to-one scheme.

Among the touch sensors configured by electrically connecting one or more common electrodes, the guard layer overlapped with a first touch sensor detecting a touch is applied with a first voltage, and the guard layer overlapped with a second touch sensor that does not detect the touch is applied with a second voltage.

The first voltage is an alternating voltage or a precharge voltage, the second voltage is a DC voltage or a ground voltage, and the first voltage and the second voltage are supplied from a touch drive IC or a power management IC.

BRIEF DESCRIPTION OF THE DRAWINGS

FIG. 1 is a conceptual diagram of a three-terminal switching element according to an exemplary embodiment of the present invention.

FIG. 2 is a view for describing a principle in which a touch capacitance and a capacitance between lines are formed.

FIG. 3 is a circuit diagram illustrating a basic structure of a touch detecting means in the display device having an embedded touch screen according to an exemplary embodiment of the present invention.

FIG. 4 is an equivalent circuit diagram of FIG. 3.

FIG. 5 is a view illustrating an example in which a touch sensor according to an exemplary embodiment of the present invention applies an alternating voltage to an equivalent capacitor Ceq between lines in order to detect a touch signal.

FIG. 6 is a view illustrating a structure of an LCD.

FIG. 7 is a view illustrating a detailed structure of a thin film transistor (TFT) of FIG. 6.

FIG. 8 is a structure view of a display device having an embedded touch screen according to a first exemplary embodiment of the present invention.

FIG. 9 is a view illustrating an example of a layout of touch sensors and a touch integrated circuit (IC) in the display device having an embedded touch screen according to an exemplary embodiment of the present invention.

FIG. 10 is a view illustrating a configuration of touch sensors in the display device having an embedded touch screen according to an exemplary embodiment of the present invention.

FIG. 11 is a structure view of the display device having an embedded touch screen according to a second exemplary embodiment of the present invention.

FIG. 12 is a view illustrating the use of a guard layer (G/L) and a transfer of a driving signal according to an exemplary embodiment of the present invention.

FIGS. 13 to 15 are views illustrating a concept in which an AC input voltage is applied, in a method for detecting a touch of a display device having an embedded touch screen according to an exemplary embodiment of the present invention.

FIG. 16 is a view for describing a method of applying required signals to a display device, a touch sensor, and a G/L in the display device having an embedded touch screen according to an exemplary embodiment of the present invention.

FIG. 17 is a structure view of the display device having an embedded touch screen according to a third exemplary embodiment of the present invention.

FIG. 18 is a structure view of the display device having an embedded touch screen according to a fourth exemplary embodiment of the present invention.

FIG. 19 is a view illustrating a configuration of a TFT substrate among components of an LCD using a transversal electric field mode.

FIG. 20 is a view illustrating an example of a display device having an embedded touch sensor according to an exemplary embodiment of the present invention using a Vcom electrode in a transversal electric field mode.

FIG. 21 illustrates a method for detecting a touch signal using a common electrode of the display device having an embedded touch screen according to an exemplary embodiment of the present invention that together performs a function of a touch sensor as the common electrode.

FIG. 22 is a conceptual view illustrating a case in which the touch sensor does not sense a vertical or horizontal motion of an object.

FIGS. 23A and 23B illustrate examples about a sharing of a touch sensor area according to an exemplary embodiment of the present invention, where the area is shared in a longitudinal direction.

FIG. 24 illustrates an example about a sharing of a touch sensor area according to an exemplary embodiment of the present invention, where the area is shared in a transversal direction.

FIG. 25 is a view of an example in which up and down or left and right areas of the touch sensors are shared in a case in which the touch sensors are positioned on upper surfaces or lower surfaces of gate lines or source lines according to an exemplary embodiment of the present invention.

FIG. 26 illustrates an example of a sharing of the touch sensor area in a case in which the common electrodes act as the touch sensors.

FIG. 27 illustrates a structure of an IC in which an LDI and a TDI are integrated into one IC according to an exemplary embodiment of the present invention.

FIGS. 28 to 30 are views illustrating a layout concept of the common electrodes and the sensor signal lines when the common electrodes act as the touch sensors, according to an exemplary embodiment of the present invention.

DETAILED DESCRIPTION OF THE ILLUSTRATED EMBODIMENTS

Hereinafter, exemplary embodiments of the present invention will be described in detail with reference to the accompanying drawings.

First, the present invention relates to a display device having an embedded touch screen and a method for detecting a touch, and more particularly, to a method of detecting a touch by applying a driving voltage to a driving capacitor (Cdrv) in a touch integrated circuit (IC) when a capacitance by a touch of a finger, or the like, is applied to a sensing pad (a pad connected to a touch detecting unit) or detecting a touch using a phenomenon that a difference in a detection voltage due to a magnitude difference in a capacitance caused by the touch is generated when an alternating driving voltage is applied to a sensing equivalent capacitor formed between the sensing pad (the pad connected to the touch sensing unit) that is detecting the touch and a non-sensing pad (a pad that corresponds to the sensing pad and is not connected to the touch detecting unit), and a touch structure in a display device enabling the detection of the touch. In the method of detecting a touch according to an exemplary embodiment of the present invention, magnitudes of a voltage detected when a touch is not generated and a voltage detected when a touch capacitance is applied by generation of a touch are compared with each other, the touch is detected by a difference between the magnitudes of these two voltages, and an influence by a parasitic capacitance, or the like, is minimized by a guard layer (G/L), thereby making it possible to more stably obtain a touch signal.

A display device stated in the present invention is any one of a kind of liquid crystal display (LCD), a plasma display panel (PDP), an active matrix organic light emitting diode (AMOLED), and a passive matrix organic light emitting diode (PMOLED), or includes all means displaying any type of still image (such as JPG, TIF, or the like) or moving picture (MPEG-2, MPEG-4, or the like) to users.

A touch input means in the present invention includes any type of input (for example, an object such as a conductor having a predetermined form or an input such as an electromagnetic wave, or the like) generating a voltage change that may be sensed by a touch sensor, as well as a keyboard, a mouse, a finger, a touch pen, and a stylus pen.

In addition, in the present disclosure, a phrase "on the same line" is used as the meaning that two components overlap with each other at the same position in a vertical direction, and a metal material, an insulator, or the like, forming a signal line may be present between the two components. For example, when A and B are positioned on the same line, it means that A is positioned on an upper surface of B or B or is positioned on an upper surface of A, and another material such as an insulator, a metal, or the like, may be present between A and B. When A and B are positioned on the same line, a width of A and a width of B are not limited unless separately mentioned, and a ratio between the widths of A and B is not specified unless separately mentioned. However, in the present disclosure, it is considered that the width of A and the width of B are the same as each other by way of example.

In addition, components such as ~ units to be described below are assemblies of unit function elements performing specific functions. For example, an amplifier of a certain signal is a unit function element, and an assembly in which the amplifier and signal converters are collected may be called a signal converting unit. In addition, a ~ unit may be included in a larger component or ~ unit or may include smaller components or ~ units. In addition, a ~ unit may include an individual central processing unit (CPU) that may process calculation functions or commands, or the like, stored in a memory, or the like.

In the following drawings, thicknesses or areas are exaggerated in order to clearly represent several layers and areas. Throughout the present disclosure, similar components will be denoted by like reference numerals. When a portion such as a layer, a area, a substrate, or the like, is referred to as being positioned on an upper portion of another portion, a portion may be directly positioned on another portion (the other portion is not present therebetween) or the other portion (for example, a medium layer or an insulating layer) may be present therebetween.

In addition, a "signal" stated in the present disclosure generally indicates a voltage or a current unless specifically mentioned.

In addition, in the present disclosure, a capacitance indicates a physical magnitude. Meanwhile, a "capacitor" indicates an element having a capacitance, which is a physical magnitude. In the present invention, a compensation capacitor (Cbal) is formed in a touch drive IC by a design and manufacturing process or is naturally formed between adjacent two sensor signal lines. In the present disclosure, both of the directly formed capacitor and the naturally formed capacitor will be called a "capacitor" without being distinguished from each other.

In the present disclosure, C used as a sign of a capacitor is used as a sign indicating the capacitor, and also indicates a capacitance, which is a magnitude of the capacitor. For example, C1 is not only a sign indicating a capacitor, but also indicates a capacitance of the capacitor.

In addition, in the present disclosure a phrase "applying a signal" means that a level of a signal maintained in a certain state is changed. For example, a phrase "applying a signal to an on/off control terminal of a switching element" means that an existing low level voltage (for example, a zero Volt or a direct current (DC) voltage or an AC voltage having a predetermined magnitude) is changed into a high level (for example, a DC voltage or an AC voltage having an amplitude value larger than that of the low level voltage).

In addition, in the present disclosure, touch sensors indicates sensing pads that are performing sensing and non-sensing pads. The sensing pads are touch sensors connected to touch detecting units in order to detect a touch among a plurality of touch sensors, and the non-sensing pads are touch sensors that do not perform detection of a touch and are not connected to the touch detecting unit. The sensing pads become the non-sensing pads after detection of a touch is completed, and any non-sensing pads are changed into sensing pads depending on a predetermined sequence. Therefore, the sensing pads and the non-sensing pads are not fixed, but may be changed depending on a time, and change sequences of the respective sensing pads and non-sensing pads may be sequentially determined depending on a predetermined sequence. A time sharing technology is an example of determining a sequence.

In addition, in the present disclosure, a phrase "detecting a touch" has the same meaning as that a phrase "detecting a touch signal", and a typical example of detection of a touch signal is to detect a difference between a first voltage detected by a touch detecting unit when a conductor such as a finger does not touch or approach a touch sensor, such that a touch capacitance is not formed, and a second voltage detected by a touch detecting unit by a touch capacitance (Ct) formed when the conductor such as the finger overlaps with the touch sensor.

In addition, in the present disclosure, a touch driver IC will be contracted as a touch IC or a TDI.

Further, in the present disclosure, pre-charging and charging and a pre-charging voltage and a charging voltage will be used as the same meaning.

Further, in the present disclosure, sensing pads may include sensor signal lines connecting the sensing pads to each other unless specifically mentioned, and non-sensing pads may include non-sensing pad signal lines connecting the non-sensing pads to each other unless specifically mentioned.

Further, in the present disclosure, source lines and gate lines will be called signal lines, and the signal lines generally indicate the gate line and the source lines or indicate only the source line or only the gate lines.

Further, in the present disclosure, a sub-pixel will also be called a pixel.

FIG. 1 is a conceptual diagram of a three-terminal switching element used as an example of a capacitor charging means in an exemplary embodiment of the present invention among switching elements. Referring to FIG. 1, the three-terminal switching element generally includes three terminals such as an on/off control terminal Cont, an input terminal In, and an output terminal Out. The on/off control terminal Cont is a terminal controlling a turn-on/turn-off of the switching element, and when a voltage or a current having a predetermined magnitude is applied to the off control terminal Cont, a voltage or a current applied to the input terminal In is output in a voltage or current form to the output terminal Out.

Before describing an example of a method for detecting a touch signal according to an exemplary embodiment of the present invention in detail, a principle in which a touch capacitance and a capacitance between lines is formed will be described with reference to FIG. 2. In an example of FIG. 2, it is assumed that a touch sensor 10 and a finger 25 are spaced apart from each other by an interval of "d" and have an overlap area (or an overlap contact area) of "A" when the finger 25 or a conductive touch means (for example, a capacitive touch pen) similar to the finger 25 approaches the touch sensor 10. In this case, as represented by a right equivalent circuit and Equation: "C=(eA)/d" of FIG. 22, a capacitance "C" is formed between the finger 25 and the touch sensor 10. In the present disclosure, the capacitance formed between the finger 25 and the touch sensor 10 is called a touch capacitance Ct.

In addition, in the example of FIG. 2, when two sensor signal lines parallel with each other, instead of the finger 25 and the touch sensor 10, are spaced apart from each other by an interval of "d" and have an overlap area of "A", a capacitance C between lines as represented by an equivalent circuit and Equation: "C=(eA)/d" of FIG. 2 is also formed between the two sensor signal lines. When the signal lines are formed of ITO or a metal, a value obtained by multiplying a thickness of an applied ITO or metal by overlap lengths between the two signal lines becomes an overlap area between the two signal lines parallel with each other, and a level at which the two overlapping signal lines are spaced apart from each other becomes a spaced distance. In an exemplary embodiment of the present invention, since an optically clear adhesive or an air layer is formed between the two signal lines, permittivity of the OCA or the air may be used as permittivity (e) in Equation: "C=(eA)/d" of FIG. 2.

FIG. 3 is a circuit diagram illustrating a basic structure of a touch detecting means in the display device having an embedded touch screen according to an exemplary embodiment of the present invention. Referring to FIG. 3, the touch detecting means specialized according to an exemplary embodiment of the present invention has a basic structure including a charging means 12, touch sensors 10, sensor signal lines 22, a parasitic capacitance capacitor Cp, and a touch detecting unit 14.

The charging means 12 is a switching element such as a transistor (TR), a field effect transistor (FET), a metal oxide semiconductor FET (MOSFET), a complementary metal oxide semiconductor (CMOS), or the like, supplying Vpre, which is a pre-charging signal (or a charging signal), to all capacitors connected to the touch detecting unit 14 and turned off by a turn-off signal applied to an "on-off control terminal" called "Cont" to make an output terminal 12-1 a high impedance state or a linear element such as an operational amplifier (OPAMP) supplying a signal depending on a control signal.

The touch sensors 10 include sensing pads 10a that are connected to the touch detecting unit 14 and detect a touch signal and non-sensing pads 10b that are not connected to the touch detecting unit 14 and do not detect a touch signal.

The sensing pads 10a and the non-sensing pads 10b are not fixed, and the same touch sensors 10 may be changed by a time sharing technology (the sensing pads are changed into the non-sensing pads after a predetermined time interval. The sensing pads 10a are connected to the touch detecting unit 14 in order to detect a touch, and the non-sensing pads 10b are not connected to (or are spaced apart from) the touch detecting unit 14. Therefore, one touch sensor 10 is divided into the sensing pad and the non-sensing pad depending on whether or not to be connected to the touch detecting unit 14.

It is assumed in an example of FIG. 3 that the touch sensors 10 become the sensing pad one by one and the other touch sensors 10 are the non-sensing pads, and a touch sensor 10 denoted by "PC" is operated as the sensing pad 10a, and all of the other touch sensors are the non-sensing pads PA, PB, PD, PE, PF, PG, PH, PI, and PJ. The touch sensor denoted by "PB" serves as the sensing pad before the sensing pad 10a denoted by "PC" is operated, and the touch sensor denoted by "PD" is changed from the non-sensing pad into the sensing pad after the sensing pad denoted by "PC" is operated. As described above, the change of the touch sensor 10 into the sensing pad and the non-sensing pad is performed by a control of a timing controlling unit 33 of FIG. 9. FIG. 3 illustrates an example of a method of detecting a touch signal using one sensing pad 10a, and a plurality of touch sensors may be simultaneously operated as sensing pads.

In FIG. 3, when the pre-charging voltage Vpre is applied to a sensing pad signal line 22a and the sensing pad 10a denoted by PC, and non-sensing pads adjacent to the sensing pad 10a and denoted by PB, PD, and PF and non-sensing signal pad lines 22b-B, 22b-D, and 22b-F connected to the non-sensing pads are connected to any voltage Vlbl having a predetermined potential difference from Vpre, capacitance are formed between the sensing pad 10a and the non-sensing pads 10b by the principle described with reference to FIG. 2.

In detail, since Vpre having a predetermined potential is applied to the sensing pad signal line 22a and the sensing pad 10a and the non-sensing pad signal line 22b-B connected to Vlbl has a predetermined overlap distance and overlap area with respect to the sensing pad signal line 22a, a capacitance between lines corresponding to C1 is formed between the sensing pad signal line 22*a* and the non-sensing pad signal line 22*b*-B by the principle described with reference to FIG. 2, a capacitance between lines corresponding to C2 is formed between the sensing pad signal line 22*a* and the non-sensing pad signal line 22*b*-D by the same principle, and a capacitance between lines corresponding to C3 is formed between the sensing pad (PC) 10*a* and the non-sensing pad signal line 22*b*-F overlapping with the sensing pad 10*a* by the same principle.

In the related art, this capacitance between lines acts as a parasitic capacitor (Cp) to act as noise reducing touch sensitivity. However, in an exemplary embodiment of the present invention, since the capacitance between lines is inversely used to detect the touch signal, Cp in Equation for calculating a voltage detected in the touch detecting unit is reduced to improve touch sensitivity, and the capacitance between lines, which is the reduced Cp, is disposed at a numerator position of Equation for the voltage detected in the touch detecting unit to improve touch sensitivity, thereby doubly improving the touch sensitivity.

Meanwhile, even though the non-sensing pad signal line 22*b*-B is present between the sensing pad signal line 22*a* and the non-sensing pad signal line 22*b*-A, a capacitance C4 between lines may be formed In the present disclosure, capacitances between lines such as C1 to C3 formed between the sensing pad signal line 22*a* and the non-sensing pad signal lines are defined as primary capacitances between lines, and capacitances such as C4 formed in a state in which one non-sensing pad signal line is present or a plurality of non-sensing pad signal lines are present between the sensing pad signal line 22*a* and a non-sensing pad signal line are defined as secondary capacitances between lines.

Therefore, a plurality of secondary capacitances between lines may be formed in the sensing pad 10*a* and the sensing pad signal line 22*a*. Since the touch sensitivity is improve when the secondary capacitances between lines are used to detect the touch, it is preferable to connect all of the non-sensing pad signal lines for forming the secondary capacitances between lines to Vlbl used to form the primary capacitances between lines. The non-sensing pad signal lines for forming the secondary capacitances between lines may be connected to a potential different Vlbl, but it is preferable to commonly use Vlbl in order to simplify a circuit.

In order to simplify the circuit or weaken the touch sensitivity in the case in which the touch sensitivity is excessively better than an expected value, it is possible to maintain the non-sensing pad signal lines (the non-sensing pad signal lines 22*b*-A and 22*b*-E in an example of FIG. 3) for forming the secondary capacitances between lines in a floating or high impedance state. Therefore, the secondary capacitances between lines are not generated between the floated non-sensing pad signal lines and the sensing pad signal line. A touch driver IC (TDI) has a means generating the secondary capacitances between lines and determining whether to connect the non-sensing pad signal line 22*b* adjacent to the sensing pad signal line 22*a* to a predetermined potential or maintain the non-sensing pad signal line 22*b* adjacent to the sensing pad signal line 22*a* in the floating or high impedance state. The voltage Vlbl connected to the non-sensing pad signal line 22*b* is a DC potential or an AC voltage including zero (0) V.

Since the primary capacitances C1 to C3 between lines and the secondary capacitances between lines are commonly connected to the sensing pad 10*a*, all of them may be represented by one equivalent capacitor. When one equivalent capacitor is an equivalent capacitor Ceq between lines, the circuit of FIG. 3 may be represented by an equivalent circuit as illustrated in FIG. 4.

Meanwhile, the equivalent capacitor Ceq between lines has the following features.

1. As an overlap length between the sensor signal lines 22*a* and 22*b* overlapping with each other becomes long, an overlap area becomes wide, such that an equivalent capacitance Ceq between lines becomes large. Therefore, as the sending pads 10*a* become distant from the TDI, equivalent capacitances Ceq between lines become large.

2. It is possible to adjust a magnitude of the equivalent capacitance Ceq between lines depending on an overlap distance between the sensor signal lines 22*a* and 22*b* overlapping with each other. Since the overlap distance is a width between the sensor signal lines 22*a* and 22*b* overlapping with each other, it is possible to change the magnitude of the equivalent capacitance Ceq between lines by a design.

Referring to FIG. 4, the equivalent capacitor Ceq between lines is formed between the sensing pad 10*a* and the non-sensing pad 10*b* adjacent to the sensing pad 10*a*, and the non-sensing pad 10*b* is connected to any voltage Vlbl.

A plurality of non-sensing pads and non-sensing pad signal lines forming the primary capacitances between lines and the secondary capacitances between lines in FIG. 3 are represented by one equivalent non-sensing pad 10*b* and one equivalent non-sensing pad signal line 22*b*. Since the predetermined voltage Vlbl is connected to all of the non-sensing pad signal lines 22*b* except for the sensing pad 10*a* in FIG. 3, the voltage Vlbl is also connected to the non-sensing pad signal line 22*b* in FIG. 4.

Therefore, although FIG. 4 illustrates as if the voltage Vlbl is connected to one non-sensing pad signal line 22*b*, Vlbl is actually connected to the plurality of non-sensing pad signal lines generating the primary and secondary capacitances between lines.

Vlbl, which is a voltage applied to one side of the non-sensing pad signal line 22*b* when the pre-charging voltage Vpre is applied to the sensing pad, is a voltage for forming the equivalent capacitance Ceq between lines by pre-charging. An alternating voltage is applied to the non-sensing pad signal line 22*b* in order to detect the touch signal, and Vlbl includes a low voltage or a high voltage of the alternating voltage.

An output terminal 12-1 of the charging means 12 and all the capacitors connected to the output terminal 12-1 are connected to the touch detecting unit 14. A buffer 14-1 is one of components constituting the touch detecting unit 14, and an input terminal of the buffer has high impedance (hereinafter, referred to as Hi-z) characteristics. When the output terminal 12-1 of the charging means 12 is connected to a Hi-z input terminal of the touch detecting unit in a Hi-z state, all the capacitor Ceq, Ct, Cvcom, and Cp connected between the output terminal 12-1 of the charging means 12 and the buffer 14-1 become a Hi-z state.

As described below, a magnitude of Ceq is changed depending on a length of the sensing pad signal line 22*a* connecting the sensing pad 10*a*, and thus, a charging time is also changed depending on a position of the sensing pad. Since the charging time cannot but be determined to be the longest charging time when the charging time is determined to be one fixed time, a touch detection time becomes slow. Therefore, the TDI has a means that may determine the charging time. The charging time is determined to be a turn-on time of the charging means 12.

Although a case in which the output terminal 12-1 of the charging means 12 is directly connected to the buffer 14-1 has been illustrated by way of example in FIG. 4, all the elements of which inputs are in a Hi-z state, such as a gate of a MOS, a gate of a TFT, or the like may be used instead of the buffer 14-1. The reason why the output terminal 12-1 of the charging means 12 and the touch detecting unit 14 become the Hi-z state is that a discharging route of isolated electric charges is not present in the Hi-z state, such that it is easy to detect a relatively accurate magnitude of a variation because the magnitude of the voltage formed at a point P of FIG. 4 is maintained for a long time.

A signal output from the buffer 14-1 is input to an amplifier 14-2. In the case in which a change amount in the voltage detected at the point P of FIG. 4 depending on whether or the touch is generated is small, it is preferable to amplify the signal using the amplifier 14-2. A DAC 14-3 may be used in the amplifier, and is generated using a ref voltage 14-4.

In addition, the signal detected and amplified in the touch detecting unit 14 may pass through an ADC 14-5 to be transferred to a signal processing unit 35 of FIG. 9. One ADC 14-5 or a plurality of ADCs 14-5 may be used, and when the plurality of ADCs 14-5 are used, the signal may be more rapidly processed.

Structures of the touch sensors in the display device having an embedded touch sensor according to an exemplary embodiment of the present invention are the same as those of the touch sensors described above, and the sensor signal lines 22 connecting the touch sensors are signal lines connecting polarity of touch capacitances formed when a touch means such as the finger 25 approaches the touch sensors 10 to the touch detecting unit 14, and may be formed using the same mask as the mask used to form the touch sensors 10. Referring to FIG. 4, a magnitude of a resistance of the sensor signal line 22 is denoted by Rt, and a magnitude of a resistance of the non-sensing pad 10*b* is denoted by Rnt.

Since these resistance components act as factors generating a delay of the touch signal at the time of detecting the touch signal, it is preferable that they are small. Therefore, it is preferable that the number of connections of the sensor signal signals 22 connected to the touch sensors disposed at a distance distant from the TDI is increased in order to reduce a resistance.

Again referring to FIG. 4, when the finger 25 of a human body approaches the touch sensor 10 at a predetermined interval, a touch capacitance Ct is formed between the finger 25 and the touch sensor 10. Ct, which is a value set by Equation: C=(eA)/d of FIG. 2, may be adjusted by adjusting an interval, an overlap area, or the like, between the touch means such as the finger 25 and the touch sensor 10. For example, when an area of the touch sensor 10 is increased, Ct is also increased depending on Equation of FIG. 2. To the contrary, when an area of the touch sensor 10 is reduced, Ct is also reduced. As an example, Ct may be designed to be several femto Farad (fF) to several tens of micro F.

Again referring to FIG. 4, the pre-charging voltage Vpre is applied to an input terminal 12-2 (FIG. 3) of the charging means 12, and is output through the output terminal 12-1 when the switching element, which is the charging means 12, is turned on by a control voltage Vg applied to the on/off control terminal Cont. Therefore, all the capacitors connected to the output terminal 12-1 of the charging means 12 are charged with the pre-charging voltage Vpre.

Therefore, when the charging means 12 is turned off by dropping the control voltage Vg of the charging means 12 from a high level to a low level after the point P of FIG. 4 is charged, the point P, which is the touch detecting unit, becomes Hi-Z, such that electric charges at the point P are isolated in the touch capacitor, the equivalent capacitor Ceq between lines, and the parasitic capacitor Cp. An example, when an alternating voltage is applied to the equivalent capacitor Ceq between lines, a magnitude of the voltage detected at the point P is in proportion to a magnitude of the alternating voltage applied to the equivalent capacitor Ceq between lines, and has a correlation with capacitances connected to the point P.

FIG. 5 is a view illustrating an example in which a touch sensor according to an exemplary embodiment of the present invention applies an alternating voltage to an equivalent capacitor Ceq between lines in order to detect a touch signal.

Referring to FIG. 5, the touch capacitance Ct formed between the touch sensor 10 and the conductor such as the finger 25, Ceq, Cvcom, and Cp are connected to the output terminal 12-1 of the charging means 12. Therefore, when the pre-charging signal Vpre is applied to the input terminal 12-2 of the charging means 12 in a state in which the charging means 12 is turned on, Ceq, Ct, and Cp are charged with a pre-charging level Vpre, such that a potential of an input terminal of the touch detecting unit 14 becomes the pre-charging level Vpre. Then, when the charging means 12 is turned off, signals charged in the three capacitors are maintained in the pre-charging signal level Vpre unless they are separately discharged.

In order to stably isolate the charged signals, the output terminal 12-1 of the charging means 12 and the input terminal of the touch detecting unit 14 are in a Hi-z state.

The touch detecting unit 14 detects a voltage of the sensing pad 10*a* (or a voltage of the point P). The touch detecting unit 14 detects a voltage of the point P when the touch is not generated (that is, when Ct is not formed), and detect a voltage of the point P when the touch is generated (that is, when Ct is formed), and obtains the touch signal using a magnitude difference between the detected two voltages. Although a sensing signal line resistor Rt is present between the sensing pad 10*a* and the input terminal of the touch detecting unit, which is the point P, in an example of FIG. 5, since magnitudes of the signal across Rt are the same as each other after a predetermined time point, an influence of Rt is ignored. Therefore, in the present disclosure, the voltage detected in the sensing pad 10*a* and the voltage detected at the point P have the same meaning.

In an exemplary embodiment of the present invention, when the point P of FIG. 5 is charged with the charging voltage Vpre, a predetermined voltage Vl and Vh is connected to one side of the non-sensing pad signal line 22*b* connected to the non-sensing pad 10*b*. Vl is a low voltage of an alternating voltage according to an exemplary embodiment of the present invention, Vh is a high voltage of the alternating voltage according to an exemplary embodiment of the present invention, and Vh and Vl are swung in the alternating voltage. Vh and Vl serve as Vlbl described above, that is, serve to form an equivalent capacitor Ceq between lines.

The alternating voltage is applied to the non-sensing pad signal line 22*b* in order to detect a touch signal when a predetermined time elapses after the charging voltage Vpre is applied. An absolute magnitude of the alternating voltage is Vh-Vl, and a potential may be changed from a high voltage Vh to a low voltage Vl or from the low voltage Vl to the high voltage Vh. The alternating voltage has various shapes such as a square wave shape, a triangular wave shape, a sine wave shape, a sawtooth wave shape, or the like, and the TDI according to an exemplary embodiment of the present invention may vary a magnitude or a frequency of the alternating voltage.

The touch detecting unit 14 detects the voltage in synchronization with a rising edge or a rising time in which the alternating voltage rises from the low voltage Vl to the high voltage Vh or a falling edge or a falling time in which the alternating voltage falls from the high voltage Vh to the low voltage Vl. It is preferable that the TDI detect the voltage after a predetermined time is delayed from the rising or falling edge when detecting the voltage in synchronization with the rising or the falling edge. The reason is that some time (for example, several tens of nano seconds or several tens of micro seconds) is required until the detected voltage is stabilized by a resistance component Rt of the sensing pad signal line 22a and a resistance component Rnt of the non-sensing pad.

In addition, since an electromagnetic wave generated in the rising edge or the falling edge of the alternating voltage may have an influence on an apparatus coupled to a capacitive touch detecting means according to an exemplary embodiment of the present invention, the TDI according to an exemplary embodiment of the present invention may further include a means adjusting a gradient of the alternating voltage in the rising edge or the falling edge. A register may be used as an example of the means adjusting the gradient in the TDI. A time in the rising edge or the falling edge is mapped to a plurality of registers, and when one of the plurality of registers is selected, an alternating voltage generating unit 42 of FIG. 9 adjusts the gradient of the alternating voltage in the rising edge or the falling edge.

When the point P of FIG. 5 is charged with the charging voltage Vpre, if it is assumed that a voltage applied to the no-sensing pad signal line 22b is Vh or Vi, the equivalent capacitor Ceq between lines is charged with a voltage corresponding to a difference between Vpre and Vh or a difference between Vpre and Vl. For example, when Ceq is charged with Vpre, if an initial voltage connected to the non-sensing pad signal line 22b is the high voltage Vh, the alternating voltage is swung from the high voltage Vh to the low voltage Vl, and a polarity of the alternating voltage is negative (−). In addition, when Ceq is charged with Vpre, if an initial voltage connected to the non-sensing pad signal line 22b is the low voltage Vl, the alternating voltage is swung from the low voltage Vl to the high voltage Vh, and a polarity of the alternating voltage is positive (+).

In the following Equation 1 and Equation 2, a capacitance, which is a magnitude of Ct, is changed depending on whether or not the touch is generated or depending on an overlap distance or an overlap area between the touch means and the touch sensing pad 10a, and a value of Ct in the following Equation 1 and Equation 2 when the touch is not detected is not present. In an exemplary embodiment of the present invention, a difference between the detected voltage when the touch is not generated, that is, when Ct is not generated, and a voltage value when the touch is generated, that is, CT is generated, is detected to detect whether or not the touch is generated or a touch area. Therefore, it is preferable to store a voltage value in a non-touch state, which is a fixed value, in a storage device (a memory 28 of FIG. 9).

When a voltage detected by the touch detecting unit 14 when all the touch sensors 10 are not touched is stored in the memory and a difference between this voltage and a voltage detected by the touch detecting unit when the corresponding touch sensor is operated as the sensing pad is detected, it is possible to easily detect whether or not the touch is generated and the touch area.

Meanwhile, Vh and Vl are generated in a power supply unit 47 of FIG. 9 in the TDI, and alternatings of Vh and Vl is generated in the alternating voltage generating unit 42 of FIG. 9 in the TDI.

Signal detected when Ceq is not used and alternating voltage is applied to G/L $$D/B = Vpre \pm Vdrv \frac{Cdrv + Cgl}{Cdrv + Cgl + Cp + Ct} \qquad [\text{Equation 1}]$$

Signal detected when Ceq is used and alternating voltage is applied to G/L $$D/B = Vpre \pm Vdrv \frac{Ceq + Cgl}{Ceq + Cgl + Cp + Ct} \qquad [\text{Equation 2}]$$

Sensed voltage detected in synchronization with AC input power $$D/B = Vpre \pm Vc^2 \frac{Ct}{Cgs + Cp + Ct} \qquad [\text{Equation 3}]$$

Ct of Equation 1 or Equation 2 may be obtained from the following Equation 4.

$$Ct = \epsilon 2 \frac{S2}{D2} \qquad [\text{Equation 4}]$$

In Equation 4, $\epsilon_2$ may be obtained from a medium between the touch sensor 10 and the finger 25, and may be calculated by a complex permittivity of a plurality of media when the plurality of media are used. $S_2$ corresponds to an overlap area between the sensing pad 10a and the finger 25. When the finger 25 covers the entirety of any sensing pad 10a, $S_2$ corresponds to an area of the touch sensor 10. When the finger 25 covers a portion of the touch sensor 10, $S_2$ will correspond to an area reduced from an area of the sensing pad 10a by an area that does not overlap with the finger 25. In addition, $D_2$ is a distance between the sensing pad 10a and the finger 25, and will thus correspond to a thickness of the protection layer 24 put on an upper surface of a touch screen panel 50.

In addition, since the touch sensors 10 and the sensor signal lines 22 according to an exemplary embodiment of the present invention are disposed in a display device, a detailed study on a structure of the display device is required. Although the display device will be described on the basis of an LCD in the present disclosure, a thin film transistor (TFT) substrate of an AMOLED is similar to that of the LCD, and thus, the spirit of the present invention described in the present disclosure is similarly applied to the AMOLED. In addition, since signal lines and pixels are included in all display devices such as a PMOLED, a PDP, or the like, and the present disclosure is a concept of disposing an embedded touch screen based on the signal lines and the pixels, the spirit of the present invention is applied to all the display devices.

FIG. 6 is a view illustrating a structure of an LCD. Referring to FIG. 6, the LCD is formed by attaching a color filter substrate 100 and a TFT substrate 200 to each other by a sealant (not illustrated). In the TFT substrate, three sub-pixels of red/green/blue form one pixel, which acts as a basic pixel unit and is also called a dot. In each of the sub-pixels, a pixel electrode, which is a transparent electrode formed of indium tin oxide (ITO), or the like, is connected to a drain of a TFT 220, and a source line 250 formed of a source metal is connected to a source of the TFT. In addition, a gate line 240 formed of a gate metal is connected to a gate of the TFT.

Color filters 110 such as red color filters R, green color filters G, and blue color filters B are formed on the same lines as those of the sub-pixels of the TFT substrate 210, and a black matrix (BM) 130 for shielding the gate lines 240 or the source lines 250 of the TFT is formed among the R/G/B.

FIG. 7 is a view illustrating a detailed structure of a thin film transistor (TFT) of FIG. 6. Referring to FIGS. 6 and 7, a gate metal layer formed of a metal component such as copper, aluminum, molybdenum, chromium, or the like, forms the gate line 240 on an upper surface of the TFT substrate 210 formed of glass, plastic, or the like. A source electrode 270 and a drain electrode 260 of the TFT are formed by a source metal layer formed of a metal component such as copper, aluminum, molybdenum, chromium, or the like, above the gate line. In addition, the source line 250 is formed on the same layer by the same source metal layer in the source electrode 270 of the TFT, and transfers an image signal to a pixel electrode 230.

The drain of the TFT 220 is connected to the pixel electrode to form Clc and Cst, and a liquid crystal (not illustrated) reacts by a potential difference between the pixel electrode 230 and a common electrode 120 to form image quality. Since an operation principle and a detailed structure of the TFT 220 are obvious to those skilled in the art, contents unrelated to the present invention are not described, but technical contents obvious to those skilled in the art are reflected in all technical contents of the present disclosure.

Although an example in which the TFT 220 has a TN structure is described, in the case of an LCD using a transversal electric field mode such as an in-plane switching (IPS) mode, a fringe field switching (FFS) mode, or the like, the operation principle of the LCD described above may be similarly applied except that the common electrode 120 of FIG. 1 is positioned on the same layer as that of the TFT substrate 210.

The touch screen of the display device having the embedded touch screen according to an exemplary embodiment of the present invention does not basically interwork with an operation of the display device. That is, the touch screen is operated asynchronously with a driving mechanism of the LCD. In the case in which signals of the touch screen and the display device according to an exemplary embodiment of the present invention have a correlation therebetween, a driving frequency of the display device is about 60 Hz, such that it is not easy to synchronize an operation frequency of a touch generally requiring a driving condition of 100 Hz or more. In addition, in the case of using a method of sensing a touch plural times and removing noise using various filters when static electricity, noise, or the like, is introduced into the touch sensor, when the touch screen is synchronized with the LCD, the touch screen is subordinated to a frequency of the LCD, such that a case in which it is impossible to detect the touch plural times in a limited time may occur.

In order to solve the problem described above, the touch screen according to an exemplary embodiment of the present invention is embedded in the display device, but is operated separately from a driving mechanism of the display device. In some cases, it may be advantage to synchronize the touch screen with a driving signal mechanism of the display device to detect a touch signal. This case is, for example, a case of improving touch detection sensitivity by synchronizing a ground or changing a specific signal of the LCD. Therefore, the touch screen according to an exemplary embodiment of the present invention supports both of a mode in which it is synchronized with a signal (for example, data enable (DE), Hsync, or Vsync) of the display device and a mode in which it is not synchronized with the signal.

FIG. 8 illustrates a first exemplary embodiment about embedding of the touch screen in the display device having an embedded touch screen, and in the display device according to an exemplary embodiment of the present invention in which a first substrate 100 on which the color filters 110 and the common electrodes 120 are formed and a second substrate 200 in which the pixel electrodes 230 and the driving signal lines are formed are disposed to overlap with each other, a sensor layer including the touch sensors 10 sensing touch signals and sensor signal lines 22 is formed below the driving signal lines.

That is, in this case, the sensor layer is installed between the gate line 240 and the source line 250 constituting the TFT substrate 210 and the TFT 220, and a sensor layer first deposited is formed of a conductive material, and is formed of a metal component such as chromium, copper, aluminum, molybdenum, or the like, or a transparent conductive material such as ITO, CNT, a metal mesh, or the like.

In addition, the touch sensors 10 are patterned and disposed on the sensor layer in a structure in which a plurality of isolated areas are regularly arranged in longitudinal and transversal directions as illustrated in FIG. 9, and the sensor signal lines 22 connecting the touch sensors 10 and a TDI 30 to each other are also disposed on the sensor layer.

In addition, the touch sensors 10 according to an exemplary embodiment of the present invention are disposed at a width wider than those of the gate lines 240 and the source lines 250, may be patterned in a matrix structure in which the plurality of isolated areas are regularly arranged in the longitudinal and transversal directions as illustrated in FIG. 9, and the sensor signal lines 22 connecting the touch sensors 10 and the TDI 30 to each other are also disposed.

Although the touch sensors 10 are installed in five columns in the longitudinal direction and in six rows in the transversal direction in an exemplary embodiment of the present invention, this is only an example, and several tens to several hundreds of touch sensors 10 may be installed in the longitudinal and transversal directions at the time of actually using the display device.

In addition, it is preferable that insulators are deposited and installed on upper surfaces of the touch sensors 10.

The touch sensors 10 according to an exemplary embodiment of the present invention described above are positioned only below the gate lines 240 and the source lines 250, which are signal lines of the LCD, and are disposed at positions that do not overlap with the pixel electrodes 230 in the vertical direction.

This is to prevent deterioration of image quality caused by distortion generated in a voltage applied to the liquid crystal by a capacitor due to coupling between the pixel electrodes 230 and the touch sensors 10 when a rising or falling voltage is applied in order to detect a touch of the touch sensors 10.

However, this structure is appropriate for using an AMO-LED or a PMOLED that does not use the liquid crystal.

In a first exemplary embodiment of the present invention, the touch sensors 10 are positioned between the TFT substrate 210 and the gate and source lines 240 and 250. In this case, it is preferable that a width of the touch sensor 10 is wider than those of the gate line 240 and the source line 250.

Further, it is preferable that a width of the touch sensor 10 is as wide as possible in a range in which the touch sensor 10 does not have an influence on the liquid crystal. The reason is that touch sensitive may be improved by widely forming a sensing area of the touch sensor 10.

In addition, the touch sensors 10 may also be disposed at edges of the pixel electrodes 230 in a range in which they do not intersect with the pixel electrodes 230 in the vertical direction. In addition, the touch sensors 10 may also be disposed below metals forming storage capacitors Cst. The metals forming the storage capacitors Cst are generally formed of the gate lines 240, and since DC is always applied to the gate lines 240, the gate lines 240 are not affected by driving signals of the sensor signal lines 22 positioned under the gate lines 240.

In addition, in a first exemplary embodiment of the present invention, the touch sensors 10 are disposed in a sub-pixel unit. That is, the touch sensors 10 may be positioned somewhere below the gate lines 240 and the source lines 250 configuring the sub-pixels, and the touch sensors 20 or the sensor signal lines 22 are not installed below certain sub-pixels in order to partition the touch sensors 10.

The sensor signal lines 22 according to an exemplary embodiment of the present invention may be formed of indium tin oxide (ITO), carbon nano tube (CNT), indium zinc oxide (IZO), zinc tin oxide (ZTO), nano wire, silver nano wire, or the like, which is a transparent conductive material. The reason is that a flash phenomenon is generated by light or an aperture ratio of the LCD is reduced when the sensor signal lines 22 are formed of an opaque metal.

According to an exemplary embodiment of the present invention, when the touch sensors 10 are positioned below the gate lines 240 and the source lines 250, which are the signal lines of the LCD, the term "below" is appropriate in the case in which the TFT substrate 210 is disposed at a lower position as illustrated in FIG. 3. When the TFT substrate of FIG. 3 is overturned by 180 degrees, such that the TFT substrate is disposed at a higher position and the TFT 220 and the touch sensor layer are positioned below the TFT substrate 210, the touch sensors 10 may be positioned above the gate lines 240 and the source lines 250. In the present disclosure, upper and lower portions are defined on the basis of the case in which the TFT substrate 210 is disposed at the lower position. Therefore, even though the TFT substrate 210 is overturned to move to the higher position, such that the upper and lower portions are exchanged with each other, absolute directions of the upper and lower portions are determined on the basis of the case in which the TFT substrate is disposed at the lower position.

In FIG. 10 illustrating an example of a configuration of the touch sensors 10 in the display device having an embedded touch screen according to an exemplary embodiment of the present invention, the touch sensors 10 are divided into 34 partitions in the transversal direction and into 42 partitions in the longitudinal direction, and the numbers of sub-pixels in the transversal direction and the longitudinal direction are 34 and 42, respectively. When it is converted into a resolution of the LCD, the resolution is 11(H)×42(V). Therefore, when taking into consideration that a high definition (HD) resolution is 1280(H)×800(V), the display device having an embedded touch screen according to an exemplary embodiment of the present invention is a display device having a significantly small size. (In an exemplary embodiment, one sub-pixel remains in an H direction). A display device of 11×42 has been set regardless of a size by way of example in the present exemplary embodiment, and display devices having various resolutions are actually used.

In FIG. 10, only the gate lines 240 and the source lines 250 are shown in the display device of 11×42 and the touch sensors 10 according to the present invention defined in FIG. 3 are shown below the gate lines 240 and the source lines 250. Thick lines indicate the touch sensors 10 and the sensor signal lines 22, and show that the touch sensors 10 and the sensor signal lines 22 are positioned below the gate lines 240 and the source lines 250.

In the case in which the touch sensors 10 are formed in the matrix structure as illustrated in FIG. 9, the touch sensors 10 may also be formed in a structure without having the mesh structure, but may be formed in the mesh structure as illustrated in FIG. 10. As another example, in the case in which the touch sensors 10 are formed in the matrix structure, the touch sensors 10 are may be formed in a mixture structure of the mesh structure and a non-mesh structure. That is, some of the touch sensors 10 may not be formed in the mesh structure, and the other of the touch sensors 10 may be formed in the mesh structure.

In addition, the touch sensors 10 have areas that become small as they become close to the TDI, and are formed in a mesh structure, as illustrated in FIG. 10. When the touch sensors 10 are formed in the mesh structure, even though disconnection is partially generated due to a process defect, a probability that the touch sensors 10 will malfunction is significantly reduced.

In an exemplary embodiment of the present invention, the number of sensor signal lines 22 is one or plural, and referring to a touch sensor 10 disposed at a left lower end and a touch sensor 10 disposed at a right upper end, the sensor signal lines 22 are formed to have two branches in an exemplary embodiment of the present invention. The sensor signal lines 22 having the two branches may be bonded to each other in the active area in which the touch sensors 10 are installed or be bonded to each other in the BM area, that is, the non-active area, of the LCD in which the TDI is installed. This is used as a method of improving a yield of a product since another sensor signal line 22 may be used even though disconnection is generated in one sensor signal line 22. When the plurality of sensor signal lines 22 are used with respect to one touch sensor 10 as described above, a probability that a problem will occur in detecting a touch may be reduced even though disconnection due to a process defect is generated in the sensor signal line.

In addition, in a first exemplary embodiment of the present invention, the touch sensors 10 are applied with the alternating driving voltage generated from the TDI 30 or the AC alternating voltage generated from the PMIC, and the touch detecting unit 14 detects the touch signals in synchronization with a rising or falling edge of the AC alternating voltage.

Again referring to FIG. 8, an insulator is present between the sensor signal line 22 and the gate line 240 or the source line 250, and a parasitic capacitance is formed between the sensor signal line 22 and the driving signal lines (the gate and source lines 240 and 250) through the medium of the insulator (hereinafter, a parasitic capacitance formed between the touch sensor 10 and the gate line 240 is called Cg, a parasitic capacitance formed between the touch sensor 10 and the source line 250 is called Cs, and an equivalent parasitic capacitance obtained by the sum of Cg and Cs is called Cgs). Cgs is a total parasitic capacitance formed between one touch sensor and the gate and source lines 240 and 250. The insulator has several tens of angstroms ($10^{-10}$) or several micrometers (μm), and referring to Equation of FIG. 22, a parasitic capacitor Cg, Cs, or Cgs have a value hundred times or more larger than that of a touch capacitance Ct detected by a touch. A touch sensor connected to the other side of the parasitic capacitance Cg/Cs/Cgs is affected by a variation in an analog voltage of a signal line connected to one side of the parasitic capacitance Cg/Cs/Cgs, that is, the source line 250 or a variation in gate-on/off voltages of the gate line 240, such that it is impossible to detect a touch signal. Therefore, a method of allowing the touch sensor 10 not to be affected by the source line 250 or the gate line 240 is required.

FIG. 11 is a view illustrating a display device having an embedded touch screen according to a second exemplary embodiment of the present invention. The display device having an embedded touch screen according to a second exemplary embodiment of the present invention further includes a guard layer (G/L) 295 preventing interference of signals between a touch screen and a signal line.

The guard layer 295 is formed between the touch sensor 10 disposed at the lowermost side and the driving signal lines (the gate and source lines 240 and 250) constituting the TFT, and overlaps with the touch sensor 10 in a one-to-one scheme as illustrated in FIG. 10 (however, the guard layer 295 does not overlap with the touch sensor 10 in a one-to-one scheme in a TDI or LDI bonding part except for an A/A). The same voltage as a voltage applied to the sensing pad 10a or the non-sensing pad 10b is applied to the guard layer 295. Alternatively, the alternating AC voltage is applied to the guard layer 295.

The G/L 295 according to an exemplary embodiment of the present invention described above is not installed only below the source line 250 or the gate line 240, but may be installed over an entire area of the display device. However, in this method, the voltage applied to the G/L 295 may have an influence on a pixel area of the display device to cause deterioration of image quality.

In a second exemplary embodiment of the present invention, a first insulator 285 is installed on upper surfaces of the touch sensors 10. The first insulator 285 is a material electrically insulating the touch sensor 10 and the G/L 295 from each other. The first insulator 285 may be formed only between the touch sensors 10 and the G/L 295, as illustrated in FIG. 11. However, this method is not preferable since a separate mask is required. In addition, it is preferable that the first insulator 285 is applied over an entire active area of the display device.

In addition, in a second exemplary embodiment of the present invention, a second insulator 286 for insulating the G/L 295 from a component of the display device, such as the gate line 240 of the TFT, is installed on an upper surface of the G/L 295. The second insulator 286 may also be partially patterned as in FIG. 10, but is not preferable since it requires a separate mask, and it is preferable that the second insulator 286 is applied over an entire A/A of the display device.

In an exemplary embodiment of the present invention, it is preferable that the first insulator 285 and the second insulator 286 are formed of the same material, and referring to FIG. 11, pads for applying signals at one side of the display device are opened in the sensor signal line 22 and the G/L 295, and a flexible circuit board such as a flexible printed circuit (FPC), a chip on flexible printed circuit (COF), or the like, is bonded through the pads. In this case, in order to expose the pad of the sensor signal line bonding part 297 and the pad for transferring the signal to the G/L 295, the first insulator 285 and the second insulator 286 are etched to open the pads. In this case, patterning may be easily performed using one mask when the first insulator 285 and the second insulator 286 are formed of the same material.

In a second exemplary embodiment of the present invention, a method for applying the driving signal to the G/L 295 includes 1) a method for applying a DC voltage or an alternating voltage output from a TDI, and 2) a method for applying the same alternating voltage as the AC voltage applied to the TDI from a power management IC (PMIC).

1) Method for Applying DC Voltage or Alternating Voltage Output from TDI

Referring to FIG. 11, parasitic capacitance (not shown) is formed between the G/L 295 and the gate line 240, and parasitic capacitance (not shown) is also formed between the source line 250 or the storage electrode (Cst electrode) and the G/L 295. When the DC voltage (including GND) which is not varied is applied to the G/L 295, even though a signal variation of the gate line 240 or the source line 250 and a signal transfer through Cg or Cs occurs, since the G/L 295 prevents the signal variation, the touch sensor 10 is not affected by the display driving signal line. As such, according to the present invention, the DC voltage is applied to the G/L 295. The applied DC voltage is transferred through the G/L bonding part 296 of FIG. 11.

In order to improve detected sensitivity of the touch sensor, the alternating voltage may be applied to the G/L 295, where the applied alternating voltage is Vlbl of FIG. 4.

There are a plurality of methods for applying Vlbl according to a structure of the touch sensor, and the methods are as follows.

when Cdrv inside the TDI is used without using Ceq of FIG. 4

As in the example of FIG. 4, when Vlbl is not applied to the non-sensing pad 10b, the alternating voltage is applied to Cdrv (not shown) (which exists inside the TDI, and has one side connected to the P point of FIG. 4 and the other side applied with the alternating driving voltage), and the touch signal is detected in synchronization with the rising or falling edge of the alternating voltage, the precharge voltage and the alternating voltage are applied to the G/L 295. As described below, since the precharge voltage is applied earlier than the alternating driving voltage, when the same voltage as the precharge voltage is applied to the G/L 295 of FIG. 11 when the precharge voltage is applied to the P point of FIG. 4, the parasitic capacitance generated between the G/L 295 and the sensing pad is removed because there is no potential difference between the G/L 295 and the sensing pad. Thereby, the precharge may be faster performed.

After the precharge, the alternating driving voltage (as an example, Vlbl) is applied to one side of Cdrv, and the touch signal is detected in synchronization with the rising or falling edge of the alternating voltage, where the same alternating voltage as the voltage applied to Cdrv is also applied to the G/L.

Referring to FIG. 11, parasitic capacitance (not shown) is generated between the G/L 295 and the touch sensor, which is defined as Cgl. When the same alternating voltage as the voltage applied to Cdrv is applied to the g/L 295, Cgl is included in a numerator of Equation of detecting the touch signal, which is advantageous to improve the touch sensitivity, as in the following Equation.

[Equation 2] Signal detected when Ceq is not used and alternating voltage is applied to G/L $$D/B = Vpre \pm Vdrv \frac{Ceq + Cgl}{Ceq + Cgl + Cp + Ct}$$

Here, Vpre is a precharge voltage applied to the touch sensor as described in the example of FIG. 4, Cdrv, which is a capacitor inside the TDI, is a capacitor of which one side is connected to the P point of FIG. 4 and the other side is applied with the alternating driving voltage, Cgl is parasitic capacitance formed between the G/L and the touch sensor, and Cp is several parasitic capacitances connected to the P point, where parasitic capacitance formed between the sensing pad and non-sensing pad is one among several parasitic capacitances. Vdrv, which is the alternating driving voltage, may be the same voltage as Vlbl of FIG. 4. A touch drive IC (TDI) detects a magnitude difference of a value when Ct does not exist in Equation 2 and D/B when the touch occurs and Ct occurs, and determines whether or not the touch is performed.

when Ceq of FIG. 4 is used

As illustrated in FIG. 4, when the alternating driving voltage Vlbl is applied to the Ceq and the non-sensing pad 10b and the same alternating voltage is applied to the G/L 295, since the same Vlbl is applied across the parasitic capacitance (not shown) generated between the non-sensing pad 10b and the G/L 295, the parasitic capacitance between the non-sensing pad 10b and the G/L 295 does not affect the touch detection, thereby improving sensitivity of the touch detection. Therefore, according to the present invention, the same alternating voltage as the voltage applied to Ceq is applied to the non-sensing pad 10b.

Thereby, the touch signal detected at the P point is as in the following Equation.

[Equation 3] Signal detected when Ceq is used and alternating voltage is applied to G/L $$D/B = Vpre \pm Vc2 \frac{Ct}{Cgs + Cp + Ct}$$

Here, Vpre is a precharge voltage applied to the touch sensor as described in the example of FIG. 4, Ceq, which is equivalent parasitic capacitance formed between the sensing pad and the non-sensing pad, is a capacitor of which one side is connected to the P point of FIG. 4 and the other side is applied with Vlbl, which is the alternating driving voltage, Cgl is parasitic capacitance generated between the G/L and the touch sensor, and Cp is several parasitic capacitances connected to the P point, where parasitic capacitance formed between the gate and the drain of the switching element of FIG. 4 is one among several parasitic capacitances. A touch drive IC (TDI) detects a magnitude difference of a value when Ct does not exist in Equation 3 and D/B when Ct occurs due to the touch, and determines whether or not the touch is performed.

In order to apply the alternating driving voltage such as Vlbl or Vdrv in the TDI to the G/L 295, a dedicated output pin outputting the alternating driving voltage to the TDI is required.

As such, according to the present invention, when the G/L 295 is installed and the DC voltage or the alternating driving voltage is applied, it is possible to detect the touch signal with a predictable Equation independently of the driving signal of the display device.

In the present invention, since a parasitic capacitance formed between the G/L 295 and the gate line 240 or the source line 250 is significantly large, driving capability of a capacitor, which is a driving element, should be significantly large in order to drive the G/L by an alternating voltage. In order for the TDI 30 to drive the G/L 295, a dedicated output terminal embedded in the TDI 30 should have significantly capacitor driving capability, which leads to an increase in a size of the TDI 30 to cause an increase in cost.

In order to solve this problem, the G/L 295 is driven using a dedicated buffer or operation amplifier (OPAMP) rather the TDI 30 in a second exemplary embodiment of the present invention. Referring to FIG. 12, an alternating voltage generated in a dedicated pin of the TDI is applied to the G/L 295 through the buffer or the OPAMP. The application of the AC voltage to the G/L 295 is performed through a G/L bonding part 296 of FIG. 11. The buffer or the OPAMP is positioned outside the TDI 30, and has driving capability for driving a capacitor having a large capacitance.

The buffer or the operation amplifier according to an exemplary embodiment of the present invention, which is an electrical element outputting the alternating voltage received from the TDI 30 as it is, has an advantage such as large driving capability. Since the G/L 295 has a wide area and a large resistance, when one buffer or OPAPM is used, driving capability may be insufficient. Therefore, a plurality of buffers or OPAMPs may be used. It is preferable that the plurality of buffers or OPAMPs are appropriately disposed at a corner portion, a central portion, a left portion, or a right portion of the G/L 295 to allow magnitudes of the alternating voltage not to be different from each other at each position of the G/L 295.

2) Method for Applying Same Alternating voltage as AC Voltage Applied to TDI from Power Management IC (PMIC)

ICON or LDI or TDI used in the present invention requires input power for an IC operation. The input power is typically 3V or 3.3V, which is defined as Vc, and magnitude thereof is limited to 3V as an example.

In the present invention, the AC input power has a potential difference of 3V, and is defined as power which is swung from a high to a low or from a low to a high on the basis of an earth ground. FIG. 13 is a view for defining the AC power used in the present invention. Referring to FIG. 13, the PMIC is applied with Vc1 of 3V, and Vc1 is a voltage of 3V on the basis of the earth ground, that an absolute ground. The PMIC, which is an IC forming Vc2, where Vc21, which is one side of the PMIC is greater than Vc22, and a potential difference between Vc21 and Vc22 is 3V as an example. For example, if Vc21 is 10V, Vc22 is 7V.

This relationship is illustrated in a waveform of FIG. 14. Vc21 and Vc22 are swung from a high to a low or a low to a high while maintaining a constant magnitude, which is in-phase. In the present invention, this voltage is defined as the AC input voltage.

Vc22 of FIG. 14 is an alternating voltage, but acts as a ground, which is called a dynamic ground. The dynamic ground has magnitude which is changed, and the potential difference of the AC input voltage based on the dynamic ground is always maintained to be constant.

An output voltage of the PMIC of FIG. 13 is variously output. Any output voltage is possible as long as Vc21 and Vc22 are any value (here, 3V), which is Vc2. For example, if Vc21 is 20V, Vc22 is 17V. In addition, if Vc21 is 8V, Vc22 is 5V.

The AC input voltage typically alternates two states. Here, a small voltage is referred to as a low voltage, and a large voltage is referred to as a high voltage (Hi voltage). The AC input voltage alternates from the low voltage to the high voltage or from the high voltage to the low voltage. There are three or more alternating states. The PMIC may be swung while changing voltages of the plurality of states in synchronization with a control signal (not shown) output from the TDI or TCON. As described below, the TDI detects the touch based on the alternating of the AC input voltage applied to the TDI.

FIG. 13 illustrates an example of a circuit in which the AC input voltage is applied to the TCON and the LCD drive IC (LDI) and the TDI used in the display device having an embedded touch screen according to an embodiment of the present invention. Referring to FIG. 13, Vc2 formed in the PMIC is applied to the ICON and the LDI and the TDI, and magnitude thereof is 3V as an example. Vc22 is the dynamic ground serving as a ground. As an example, the AC input voltage alternates two states in which Vc21 is 10V and Vc22 is 7V, from a high to a low or from a low to a high.

In FIG. 13, an L/S, which is a level shifter, is a circuit element transferring a video signal of a graphic card or a CPU in a system (not shown) to the ICON or the LDI. In order to use the level shifter to transfer the signal of the case in which there are two grounds, the two grounds are required in view of those skilled in the art, and in the present exemplary embodiment, an absolute ground and Vc22 are used. Since there is also a case in which the ICON provides the video signal to the LDI in any exemplary embodiment, in this case, the L/S exists between the ICON and the LDI, and Vc1 is applied to the ICON as in the absolute ground.

Again referring to FIG. 13, many voltages, which is reasonable for those skilled in the art, such as a voltage of about −20V, which is a gate off voltage, a voltage of 12V, which is a gate on voltage, and 5V, which is a common voltage, are generated from a power terminal in the LDI of FIG. 13. Since the ground of the LDI is the dynamic ground (Vc22), many voltages generated in the LDI will form a potential on the basis of the dynamic ground. For example, the meaning that the common voltage is 5V means that the common voltage is 12V when magnitude of Vc22, which is the dynamic ground, is 7V, and the common voltage is 8V when Vc22 is 3V.

This aspect is also applied to the TDI and the G/L according to the present invention. The TDI generates Vlbl, or Vpre, or various reference voltages defining the ADC or the DAC, where since the ground of the TDI is also applied with Vc22, which is the dynamic ground, in the case in which absolute magnitude of Vlbl on the basis of the earth ground is 8V, if Vc22 is 7V, relative magnitude of Vlbl to Vc22 is 15V. In addition, when Vc22 is swung from 7V to 3V, Vlbl is also swung from 16V to 11V.

When the AC input voltage is applied to the LDI, the TDI, the ICON, and the G/L as illustrated in FIG. 15, since the Vc22, which is the dynamic ground, applied to the LDI, the TDI, the ICON, and the G/L is swung with reference to FIG. 8, it may be appreciated that the source line or the gate line is also swung in synchronization with Vc22, but magnitude of the signal is maintained to be constant as in the waveform of FIG. 14. In addition, the touch sensor is also swung in synchronization with Vc22.

After Vpre is applied to the touch sensor and Vc2 is swung from the low to the high or from the high to the low while maintaining the constant voltage, the parasitic capacitance generated between the driving signal line and the touch sensor of FIG. 8 does not affect the touch detection.

When it is assumed that the magnitude of the voltage at which the AC input power is swung is Vc2 when Vlbl of FIG. 4 is not operated, the touch signal is detected from the touch pad in synchronization with the alternating of the AC input voltage, which is indicated by Equation 4.

[Equation 4] Sensed voltage detected in synchronization with AC input power $$Ct = \epsilon 2 \frac{S2}{D2}$$

Here, Vc2 is magnitude of the voltage at which the LDI and the TDI are swung on the basis of Vc22, which is the dynamic ground which is simultaneously applied to the LDI and TDI, Cgs is equivalent parasitic capacitance of the parasitic capacitance formed between the touch sensor and the signal line, Ct is touch capacitance detected from the touch sensor 10 by an object such as a finger, and Cp is parasitic capacitance added to the sensing pad 10a.

Since there is no Cgs in Equation 4, it may be appreciated that significantly large touch sensitivity may be obtained for Cp having a relatively small value. However, a touch detection method in synchronization with the AC input power has a disadvantage that it requires the PMIC or the level shifter.

If the touch signal is detected in synchronization with the AC input voltage, it is preferable that an edge signal of Vlbl is first driven and the AC power is then swung when the touch is detected by intervening a rising edge or a falling edge of Vlbl of FIG. 4. A time difference at this time is within about 0.1 μs to 30 μs.

In a second exemplary embodiment of the present invention, the touch sensors 10 are applied with the alternating driving voltage generated from the TDI 30 or the AC alternating voltage generated from the PMIC, and the touch detecting unit 14 detects the touch signals in synchronization with a rising or falling edge of the AC alternating voltage.

In addition, the same voltage as the AC alternating voltage synchronized at the time of detecting the touch signal by the touch detecting unit 14 is applied to the G/L.

Referring to FIG. 9, FIG. 9 is an example of the touch screen panel according to an exemplary embodiment, and at a lower end of FIG. 9, a configuration of the touch drive IC (TDI) 30 is illustrated. The TDI 30 may include a driving unit 31, the touch detecting unit 14, a timing controlling unit 33, a signal processing unit 35, a memory unit 28, an alternating voltage generating unit 42, a power supply unit 47, and a communicating unit 46, and may further include a CPU 40. The CPU 40 is a microprocessor having a calculation function, and may also be positioned outside the TDI 30.

The driving unit 31 includes the charging means 12, and includes a function of selecting the sensing pad and the non-sensing pads among a plurality of touch sensors 10 and connecting the selected sensing pad and non-sensing pads to the touch detecting unit 14. In addition, the driving unit 31 includes a function of one side of the non-sensing pad signal line to Vh or Vl during a charging operation using the charging means 12.

The timing controlling unit 33 serves to generate a plurality of different clocks required in the TDI 30. For example, clocks are required in order to operate the CPU 40, and are also required in order to operate the ADC or sequentially operate multiplexers of the driving unit 31. Several kinds of clocks are required for each function as described above, and the timing controlling unit 33 may generate and supply the plurality of various clocks as described above.

The signal processing unit 35 transfers an ADC value generated in the touch detecting unit 14 to the CPU 40, controls the communicating unit 46 to transmit the ADC value to the outside of the TDI 30 through inter-integrated circuit (I2C) or serial peripheral interface bus (SPI) signal lines, or generates and supplies signals required in all functional elements in the TDI 30, such as the touch detecting unit 14, the driving unit, or the like. Functional elements or functional blocks indicate components performing the respective functions illustrated in FIG. 9. For example, currently, nine functional blocks are included in the TDI, and the CPU 40 is one of the nine functional blocks. The signal processing unit 35 stores the ADC value generated in the touch detecting unit 14 in the memory unit 28, and/or performs a required calculation. For example, the signal processing unit 35 may calculate a touch area due to the touch between the touch sensor 10 and the touch means with reference to the ADC value generated in the touch detecting unit 14, and may also calculate a touch coordinate using the ADC value or the calculated touch area value.

The memory unit 28 may be formed of a flash memory, an electrically erasable programmable read only memory (EEPROM), a static random access memory (SRAM), or a dynamic RAM (DRAM). Several register values required for driving the TDI 30 or programs required for operating the CPU 40 are stored in the flash memory or the EEPROM.

Many functions of The CPU 40 may overlap with functions performed by the signal processing unit 35. Therefore, the CPU 40 may not be included in the TDI 30 or may be positioned outside the TDI 30. Any one of the CPU 40 and the signal processing unit 36 may not be temporarily used in a section in which it is expected that the CPU 40 and the signal processing unit 36 will redundantly perform their functions.

The CPU 40 may perform most of the functions performed by the signal processing unit 35, and extract a touch coordinate, performs a gesture such as zoom, rotation, movement, or the like, or performs several functions. In addition, the CPU 40 may calculate an area of a touch input to generate a zooming signal, calculate strength of the touch input, and process data in various forms in which only a graphic user interface (GUI) object desired by a user (for example, a GUI object of which a large area is detected) in the case in which GUI objects such as a keypad are simultaneously touched is recognized as an effective input and use the processed data in the TDI 30 or transmit the processed data to the outside through communication lines.

A program for controlling the CPU 40 may be installed in the memory unit 28 and be replaced by a new program when corrections are generated. The new program may be executed using communication bus included in the communicating unit 46, for example, serial communication such as an I2C, an SPI, a universal serial bus (USB), or the like, or parallel communication such as a CPU interface (hereinafter, referred to as I/F), or the like.

The communicating unit 46 performs a function of outputting required information to the outside of the TDI 30 or inputting information provided from the outside of the TDI 30 to the inside of the TDI. In the communicating unit, the serial communication such as the I2C, the SPI, or the like, or the parallel I/F such as the CPU I/F, or the like, is used.

The alternating voltage generating unit 42 generates the alternating voltage applied to the equivalent capacitor Ceq between lines. The high voltage Vh and the low voltage Vl of the alternating voltage are generated by the power supply unit 47, and the alternating voltage generating unit 42 combines the high voltage Vh and the low voltage Vl with each other to generate the alternating voltage, thereby allowing the driving unit 31 to use the alternating voltage. In addition, the alternating voltage generating unit 42 has a means adjusting the gradient of the alternating voltage in the rising edge or the falling edge.

In an example as illustrated in FIG. 9, the number of sensing pads detecting the touch signal is one or plural, and it is preferable that the number of sensing pads is plural in terms of reducing a sensing time. The sensing pads may be randomly selected among thirty touch sensors 30 disposed in six rows Row1 to Row6 and five columns Col1 to Col5, and may be selected column-by-column or be selected row-by-row. In an exemplary embodiment of the present invention, coordinates of rows and columns are set on the basis of a position of the TDI. Therefore, the coordinates of the rows and the columns of the touch detecting sensors are not fixed, but may be relatively changed depending on a setting position of the TDI.

In an example in which the sensing pads are selected column-by-column, when six touch sensors 10 included in Col1 are determined to be simultaneously initial sensing pads, all of the six touch sensors 10 included in Col1 are operated as the sensing pads. (In this case, touch sensors included in Col2 to Col6) are operated as the non-sensing pads.) However, in this case, the equivalent capacitor Ceq between lines described above is not formed or has a small capacitance even though it is formed, such that touch detection sensitivity becomes small. Therefore, it is preferable that the touch is sensed row-by-row as compared with column-by-column. The reason is that when the touch is sensed row-by-row, adjacent sensing pad signal lines 22 are not present, such that a malfunction due to interference of signals is not generated.

All of the touch sensors 10 included in Row2 to Row6 are operated as the non-sensing pads during a period in which five touch sensors 50 included in Row1 are selected and operated as the sensing pads. When the five touch sensors 50 included in Row1 completes functions of the sensing pads, a process in which five touch sensors 50 included in Row2 become the sensing pads and touch sensors 50 included in Row1 and Row3 to Row6 are operated as the non-sensing pads is sequentially repeated. Since the five touch sensors 10 included in Row1 are operated as the sensing pads, it is preferable that five driving units 31 are present in the TDI. Therefore, the five sensing pads are simultaneously driven, thereby making it possible to reduce a touch detection time.

Meanwhile, referring to the first feature of two features of the sensing equivalent capacitor Ceq between lines described above, a sensing equivalent capacitance Ceq when the five touch sensors 50 included in Row1 are operated as the sensing pads is larger than a sensing equivalent capacitance Ceq when the five touch sensors 50 included in Row6 are operated as the sensing pads. The reason is that a length of the sensor signal lines 22 connected to the touch sensors 10 positioned in Row1 is longer than that of the sensor signal lines 22 connected to the touch sensors 10 positioned in Row6. Since magnitudes of the sensing equivalent capacitances Ceq formed in the sensing pads becomes large as the sensing pads become distant from the TDI, it is preferable to compensate for different magnitudes of the sensing equivalent capacitances Ceq in order to detect a uniform touch signal. The meaning of the compensation for the magnitudes of the sensing equivalent capacitances Ceq is to allow the same voltage to be detected even though positions of the sensing pads are different from each other with respect to the same touch capacitance Ct by adding a compensation capacitor to the sensing equivalent capacitance Ceq of Equation 1 or Equation 2.

The display device having an embedded touch screen according to an exemplary embodiment of the present invention has a means compensating for the different magnitudes of the sensing equivalent capacitances Ceq so that the same touch sensitivity is maintained in each position on the basis of the magnitudes of the sensing equivalent capacitances Ceq different from each other in each position.

FIG. 16 is a view for describing a method of applying required signals to a display device, a touch sensor 10, and the G/L 295 in the display device having an embedded touch screen according to an exemplary embodiment of the present invention. In FIG. 16, part X is an area in which an image is displayed or the touch sensors 10 according to are installed, and will be called an active area or an A/A in the present disclosure. The first pads 310 of FIG. 16 are pads to which signals for the display device are applied, and signals transferred from the LDI are applied to the first pads 310. In addition, the second pads 320 receive signals transferred from the TDI, the buffer, or the like, and are connected to the G/L 295. In addition, the third pads 330 are pads connected to the touch sensors 10.

In FIG. 16 illustrating an example about connection of signal lines, signal lines of the display device transferred from the LDI are denoted by solid lines, signals transferred to the touch sensors are denoted by dotted lines, and signals transferred to the G/L are denoted by double solid lines. Since the respective signal lines are positioned on different layers, a short-circuit is not generated.

In addition, in the display device having an embedded touch screen according to an exemplary embodiment of the present invention, different substrates, for example, flexible circuit boards such as FPC or COF may be attached onto pads for transferring the signals to the LDI, the TDI 30, and the G/L 295, respectively. Alternatively, one flexible circuit board may be attached onto the pads in order to reduce costs.

Further, although not illustrated, a COG type of LDI and a COG type of TDI 30 may be attached to one side of the display device rather than the pads. Referring to FIG. 16, the LDI and the TDI may be attached in a COG form to an area in which the pads are positioned. Therefore, a quantity of signals transferred from the outside to the display device may be significantly reduced, a size of the flexible circuit board may be reduced, and a cost may be reduced.

That is, in the case in which a COG type of IC is used, the signals transferred to the G/L 295 may be generated in the COG type of TDI 30 and be transferred to the G/L, or may be generated in the COG type of TDI and be connected to the G/L through the flexible circuit board attached to a lower side of the COG type of TDI, an external buffer, and the flexible circuit board. Alternatively, one of outputs of the alternating AC voltage may be connected to the G/L.

In first and second exemplary embodiments in which the touch sensor 10 is positioned below the signal line as described above by way of example with reference to FIGS. 8, 10, and 11, in the case in which a person's hand touches an upper portion of the color filter of FIG. 6, the touch sensor 10 is covered by the gate line 240 or the source line 250, such that it is impossible to detect a touch signal. In order to overcome the problem described above, the display device is set so that the TFT substrate 210 is directed toward an upward direction and the color filter substrate 100 is directed toward a downward direction. Therefore, the touch sensor 10 is directed toward the uppermost portion, and any resistance material is not present on an upper surface of the touch sensor 10, such that it is possible to detect a touch by an object such as a finger, or the like.

The display device having an embedded touch screen according to an exemplary embodiment of the present invention is characterized in that the touch screen is positioned on upper surfaces of the TFT and the source lines 250 and the gate lines 240 constituting the TFT. When the touch screen is positioned below the source lines 250 and the gate lines 240, the LCD should be overturned by 180 degrees. However, it is impossible to overturn the LCD or it is possible to mount the touch sensors on upper surfaces of the signal lines in an LCD using an IPS mode or an FFS mode corresponding to a transversal electric field mode in which Vcom is not present in the color filter substrate of FIG. 5.

Before describing the technical spirit of mounting the touch sensors on the upper surfaces of the signal lines as described above, a structure of an LCD using the transversal electric field mode will be described below since the IPS mode or the FFS mode corresponding to the transversal electric field mode in which the touch sensors according to an exemplary embodiment of the present invention will be embedded is different from the TN structure.

FIG. 19 is a view illustrating a configuration of a TFT substrate among components of an LCD using a transversal electric field mode. In the LCD using the transversal electric field mode, common electrodes 120 are not scattered over an entire surface of a color filter, but are formed in only a partial area of a TFT substrate rather than the color filter, unlike the LCD using the TN mode described above.

As illustrated in FIG. 19, the gate lines 240 and the source lines 250 are disposed in the longitudinal and transversal directions on an upper surface of the TFT substrate, and areas formed by the gate lines 240 and source lines 250 form pixels. TFTs 220 switching image signals are installed in the pixels. Gate electrodes 265 of the TFTs 220 are connected to the gate lines 240 to receive scanning signals applied thereto, and source electrodes 270 and drain electrodes 260 of the TFTs 220 are connected to the source lines 250 and pixel electrode signal lines 235, respectively. In addition, a semiconductor layer 257 of the TFT 220 forms a channel between the source electrode 270 and the drain electrode 260 in order to apply an image signal to a liquid crystal layer. Common electrode signal lines 125 are formed in parallel with the pixel electrode signal lines 235 in the pixels as illustrated.

In the LCD having the configuration as described above, when the TFTs 220 are operated to apply the image signals to the pixel electrode signal lines 235, transversal electric fields that are substantially in parallel with each other are generated between the common electrode signal lines 125 and the pixel electrode signal lines 235, and liquid crystal molecules move on a plane.

Although a case in which the common electrode signal lines 125 are positioned below the pixel electrode signal lines 235 has been illustrated in FIG. 19, the common electrode signal lines 125 may also be positioned on upper pixel electrode signal lines 235 with an insulator interposed therebetween.

FIG. 20 is a view illustrating an example of a display device having an embedded touch sensor according to an exemplary embodiment of the present invention using a common electrode in a transversal electric field mode. Referring to FIG. 20, eight pixels partitioned by the gate line 240 and the source lines 250 are present, and the common electrode signal lines 125 of four pixels are collected to form one common electrode partitioned by a solid line. The solid line of FIG. 20 is a virtual partition representing that the common electrode lines 125 are collected in one common electrode 120, and in reality, only common electrode signal lines 125 denoted by an oblique line are present.

Four common electrode signal lines 125 are coupled and are electrically connected to each other between common electrode signal lines 125 of different pixel electrodes 230 as in the left of a lower common electrode 230 or are coupled and are electrically connected to each other on upper surfaces or lower surfaces of the gate lines 240 and the source lines 250 therebetween, thereby making it possible to form one common electrode 120.

The common electrodes 120 at which a plurality of common electrode signal lines 246 are coupled to each other may be operated as the touch sensors according to the present invention, and the sensor signal lines 22 connect the common electrodes 120 to the TDI 30.

The common electrodes 120 are also installed on upper surfaces or lower surfaces of the gate lines 240 or the source lines 250 in order to increase contact areas with an object such as a finger, or the like, in addition to a general case in which they are positioned in pixel parts as illustrated in FIG. 28. According to an exemplary embodiment of the present invention, in the case in which the common electrodes 120 are installed on the upper surfaces or lower surfaces of the gate lines 240 or the source lines, since parasitic capacitance is generated between the common electrodes 120 and the driving signal lines (the source lines and the gate lines), it is preferable to reduce overlap areas of the common electrodes overlapped with the driving signal lines (the source lines and the gate lines).

As an method thereof, as illustrated in FIG. 29, in order to reduce the overlap areas between the common electrodes 120 and the driving signal lines (the source lines and the gate lines), one or more slits 121 (portions in which grooves are cut) may be formed in some regions of the common electrodes 120, that is, the regions in which the driving signal lines and the common electrodes overlap with each other. Therefore, according to the present invention, the common electrodes are not formed in the slits 121. The overlap areas with the driving signal lines (the source lines and the gate lines) are reduced by the slits 121 of the common electrodes 120, as illustrated in FIG. 28, thereby making it possible to reduce an occurrence of the parasitic capacitance. In this case, a size of connecting parts 122 connecting the respective common electrodes 120 to each other is not limited, and may be changed depending on a size of the slit 121.

Referring to A and B of FIG. 20, the sensor signal lines 22 are installed on side surfaces of the source lines 250. However, actually, the sensor signal lines 22 are disposed on the upper surfaces or the lower surfaces of the source lines 250 so as to overlap with the signal lines, such that they are not viewed with the naked eyes, and connect the common electrodes 120 operated as the touch sensors 10 to the TDI 30.

Although four common electrode signal lines 125 are disposed in one common electrode 120 in FIG. 20, several tens to several hundreds of common electrode signal lines 125 actually form one common electrode 120.

A significant number of pixels are present in the display device. For example, an HD display device has pixels of 1280×720, a significant number of common electrodes 120 according to the present invention should be installed in the LCD using the transversal electric field mode. FIG. 20 illustrates a shape in which the common electrodes 120 are disposed in the transversal electric field mode. Referring to FIG. 20, a plurality of common electrodes 120 in the transversal electric field mode are installed in the longitudinal and transversal directions, and each common electrode 120 is connected to one sensor signal line 22 to thereby be connected to the TDI 30.

The common electrode 120, which is a portion constituting the pixel, should be a transparent electrode formed of ITO. The sensor signal lines 22 may be formed of the same material as the common electrodes 120, and may be separated in a predetermined region, and one or more signal lines may connect one touch sensor 10 and the TDI 30. In addition, when the sensor signal lines 22 connect the common electrodes 120 operated as the touch sensors 10 and the TDI 30 to each other, the sensor signal lines 22 are formed to overlap with pixel regions except for the pixel regions included in the touch sensors 10, where the sensor signal lines 22 may be formed to be (vertically or horizontally) overlapped with one or more sub-pixel regions or overlap with some regions of one sub-pixel.

For example, as illustrated in (a) of FIG. 30, in the case in which one pixel includes a red (R) sub-pixel, a green (G) sub-pixel, and a blue (B) sub-pixel, the sensor signal lines 22 may be formed to (vertically or horizontally) overlap with the respective R, G, and B sub-pixels by connecting three sensor signal lines 22 to the common electrodes 120 operated as one touch sensor 10, where the respective sensor signal lines 22 may be formed to be overlapped between boundary lines of the R, G, and B sub-pixels, or may be formed to overlap with the boundary lines of the R, G, and B sub-pixels.

In addition, as illustrated in (b) of FIG. 30, a first sensor signal line 22-1 connected to a first touch sensor 10-1 positioned at the uppermost portion in one column is formed to overlap with a region between a line on which the B sub-pixel is disposed and a line on which the G sub-pixel is disposed, or is formed to overlap with some regions of a boundary line between the B sub-pixel and the G sub-pixel. In addition, a second sensor signal line 22-2 connected to a second touch sensor 10-2 positioned below the first touch sensor 10-1 is formed to overlap with a region between the line on which the G sub-pixel is disposed and a line on which the R sub-pixel is disposed, or is formed to overlap with a boundary line region between the G sub-pixel and the R sub-pixel. In addition, a third sensor signal line 22-3 connected to a third touch sensor 10-3 positioned below the second touch sensor 10-2 is formed to overlap with a region between the line on which the R sub-pixel is disposed and a line on which the B sub-pixel of a left pixel is disposed, or is formed to overlap with a boundary line region between the R sub-pixel and the B sub-pixel of the left pixel.

However, the sensor signal lines 22 are not limited to the above-mentioned illustration, and a width thereof may be variously formed in a region over the sub-pixel. As such, the sensor signal lines 22 according to an exemplary embodiment of the present invention are formed to overlap with the pixel regions except for the regions of the common electrodes 120 formed as the touch sensors 10, such that the width of the sensor signal lines 22 is sufficiently secured, thereby making it possible to decrease a resistance value of the sensor signal lines 22, and to stably apply a common voltage to the regions other than the touch sensors 10 at the time of driving the display device. In addition, in the case in which the sensor signal lines 22 are formed of the same material as the common electrodes 120, since the touch sensors 10 and the sensor signal lines 22 may be formed by one mask, costs for manufacturing the display device may also be reduced.

Although the exemplary embodiment of the present invention illustrates the case in which the common electrodes 120 operated as the touch sensors 10 are indicated by a quadrangular shape, the common electrodes 120 are not limited thereto, but may be implemented in various shapes such as triangular shape, a pentagonal shape, and the like, and edges of the common electrodes operated as the touch sensors 10 or the sensor signal lines 22 may be configured in a zigzag shape having a predetermined angle in order to improve visibility. In addition, a pattern of a clamp (>) shape or a fine pattern of various shapes is formed in the common electrodes operated as the touch sensors 10 or the sensor signal lines 22.

As another example, in the case in which the sensor signal lines 22 connected to the common electrodes 120 are installed above or below the gate lines 240 or the source lines 250, the sensor signal lines 22 do not need to be transparent electrodes. When the sensor signal lines 22 connected to the common electrodes 120 are formed of a metal such as copper, aluminum, or the like, they have a resistance lower than that of the transparent electrode, which is advantageous in capturing a touch signal.

The sensor signal lines 22 may be patterned and manufactured using a separate dedicated mask. When the sensor signal lines 22 are manufactured commonly using a source metal, a gate metal, or a metal mask in a process of manufacturing the TFT, the number of masks is reduced, thereby making it possible to reduce a manufacturing cost. When the common electrodes 120 and the common electrode lines 125 of FIG. 20 are installed to overlap with the source lines 250 or the gate lines 240, the common electrodes 120 and the common electrode lines 125 are affected by a pixel signal voltage or gate on/off voltage applied to the source lines 250 or the gate lines 240, and the above effect acts as noise at the time of detecting the touch. In order to avoid the above-mentioned problem, two methods are suggested.

A first method is a method for detecting a touch using a poach period in which the LCD is not driven. The poach period includes a poach of a line synchronization signal Hsync and a poach of a frame synchronization signal Vsync, and since a signal voltage for configuring the image of the LCD is not changed in the poach, the TDI receives the frame synchronization signal, the line synchronization signal, or information related to data enable or poach from the LDI or the ICON, thereby making it possible to detect the touch signal using the poach.

A second method is a method for installing the G/L (not shown) between the gate lines 240 or the source lines 250 and the common electrodes 120. The G/L used therein uses the same technical spirit as the G/L described above. According to the present invention, in the display device using the common electrodes as the touch sensors, a method for applying the driving signal to the G/L includes 1) a method for applying a DC voltage or an alternating voltage output from a TDI, and 2) a method for applying the same alternating voltage as the AC voltage applied to the TDI from a power management IC (PMIC), in the same contents as the G/L described above.

FIG. 21 illustrates a method for detecting a touch using a common electrode of the display device having an embedded touch screen according to an exemplary embodiment of the present invention that together performs a function of a touch sensor as the common electrode. In a touch sensor structure according to an exemplary embodiment formed in the matrix structure as illustrated in FIG. 9, there are touch sensors performing a touch signal detection and touch sensors that do not perform the touch signal detection, where the touch sensors performing the touch signal detection are referred to as sensing pads (SP) and the touch sensors that do not perform the touch signal detection are referred to as non-sensing pads (NSP). Referring to FIG. 21, the touch sensors connected to the touch signal detecting unit are SP, and touch sensors which are not connected to the touch signal detecting unit are NSP. Although FIG. 21 illustrates only one SP by way of example, a plurality of touch sensors may be operated as the sensing pads (SP) through a plurality of touch signal detecting units, thereby making it possible to reduce a time taken to detect the touch signal.

Referring to FIG. 9, all touch sensors belonging to one transversal direction such as Row1 or Row2 may be operated as SP. Alternatively, all touch sensors belonging to one longitudinal direction such as Col1 or Col2 may be operated as SP. However, when the touch signals are simultaneously detected using the touch sensors in the longitudinal direction, the SPs are affected by each other due to parasitic capacitance between a signal line and a signal line, which may cause error of the detection signal.

However, as described above, even in the structure as illustrated in FIG. 9, when the AC input power is used, the interference due to the parasitic capacitance between the signal line and the signal line is removed, thereby making it possible to detect the touch signal.

In addition, in the case in which the touch signal is detected only using the AC input power and the alternating voltage necessary for the touch detection within the TDI is not used, it is also possible to use the sensing pads (SP) which may perform the touch detection in all touch sensors of FIG. 9. In this case, since a plurality of touch signal detecting units, an ADC, and a DAC are required, a volume of the TDI may be increased, but there is an advantage that the touch signal may be detected within a fast time.

Again referring to FIGS. 9 and 19, when the touch signal is detected using the touch sensors 10 included in one longitudinal direction or one transversal direction, in the case in which the volume of the TDI is increased due to an increase in the number of the touch signal detecting units 14, it is also possible to detect the touch signal by dividing the number of the touch sensors. For example, in the case in which the touch signal is detected using five touch sensors in a Row1 direction, the touch signal is first detected using even-numbered touch sensors, that is, touch sensors of (Row1, Col2) and (Row1, Col4) as the sensing pads, and the touch signal is then detected from odd-numbered touch sensors ((Row1, Col1), (Row1, Col3) and (Row1, Col5)). If there are a plurality of touch sensors, it is also possible to divide the number of the touch sensors three times or four times.

The above-mentioned method has an advantage that a small number of touch detecting units 14 operate the plurality of touch sensors 10 to detect the touch signal, thereby making it possible to reduce the volume of the TDI.

For example, in the case in which the number of touch sensors installed in Row1 is 30, when 15 touch signal detecting units are used, and the even-numbered and odd-numbered touch sensors are connected to the touch detecting units by classifying a time difference, it is possible to detect the touch signal from the 30 touch sensors using 15 touch signal detecting units.

Although the example in which the touch sensors including the even-numbered touch sensors and the odd-numbered touch sensors are classified to be connected to the touch signal detecting units is illustrated, it is also possible to divide the touch sensors into a left direction and a right direction to perform a time sharing to be connected to the touch signal detecting units.

As such, according to the present invention, it is possible to divide the touch sensors into plural and to share the touch signal detecting unit using a time sharing method. In this case, it is possible to partition the touch sensors into an even-number or an odd-number, or classify the touch sensors into the left direction and the right direction. Besides, it is possible to partition the touch sensors into a plurality of n touch sensors according to any defined rule.

As described above, according to the present invention, in the method for detecting the touch signal using the common electrodes, an object of the common electrodes substantially serves as the common electrodes of the display device, the common electrodes in the transversal electric field mode of the LCD, or the cathode of the OLED, particularly, the AMOLED.

Therefore, a common voltage needs to be always applied to the common electrodes, and a driving method in which the common voltage is changed should not be applied. The above-mentioned driving method will be described below, but a method for applying a constant common voltage to the common electrodes is as follows.

Referring to FIG. 21, the SP and the NSP co-exist in the common electrodes. The method for applying the unchanged common voltage to the common electrodes includes first applying a common voltage Vcom, which is a DC voltage having constant magnitude, including 0V or a ground to the NSP, and not changing the common voltage Vcom even in the case in which the touch signal is detected from the SP. To this end, when the touch signal is detected from the SP, the common voltage Vcom connected to the NSP maintains the constant voltage.

In addition, the common voltage having the same magnitude may be applied to all NSPs, the common voltage may be differentially supplied for each of individuals, for each of groups, and for each of positions.

In addition, the SP is also precharged with the common voltage Vcom. When the touch is detected from the SP, a slight potential variation occurs in the SP, such that a slight variation occurs in the common voltage Vcom applied to the SP, which causes abnormality of quality of image, but since the object such as the finger, or the like is in contact with the screen, the abnormality of quality of image of the screen will not be viewed.

As such, according to the present invention, it is possible to always apply the common voltage required for the display device to the common electrodes operated as the NSP, and to normally drive the display device using the common voltage required for the display device as the precharge voltage for the common electrodes operated as the SP.

In addition, the common voltage applied to the NSP and the common voltage precharged to the SP are the same voltage. Alternatively, the common voltage applied to the SP may be greater or smaller than the common voltage applied to the NSP. When the precharge is intended to be performed within a fast time due to turn on resistance of a switching element to which the common voltage is transferred to the SP through an on/off switching element at the common voltage or the parasitic capacitance connected to the SP, the case in which the charging falls short due to a lack of a charging time may occur.

The common voltage is a positive voltage including the ground, but since a negative voltage may be applied, it is preferable that when the common voltage is the positive voltage, the common voltage higher than a target value is applied, and when the common voltage has a negative value, the common voltage lower than the target value is applied.

According to the present invention, when the common voltage is applied to the common electrodes, a means for varying magnitude of the common voltage is included, the means for varying the common voltage may be implemented inside or outside the TDI. In the case in which the means for varying the common voltage is implemented in the TDI, the common voltage may be generated in a combination of the DAC or internal resistance in the TDI, and magnitude of the generated common voltage may be adjusted through a resistor. Although not shown, a plurality of resistors are matched in a one-to-one scheme for each of magnitudes of the common voltage, and it is possible to select different common voltage according to a selection of the resistor. For example, eight different common voltages may be mapped to a resistor block including 3 bits, and when 00h, which is the least significant bit (LSB), is selected, the magnitude of the common voltage is −1.5V, 01h is −1.6V, and the magnitude of the last 07h is −22V. In addition, in the case in which the means for varying the common voltage is implemented outside the TDI, the voltage may be directly applied to the common electrodes from the outside, or the voltage may be applied by varying the magnitude of the common voltage by an external variable resistance, and in this case, it is preferable that the TDI further includes a means capable of selecting the application of the common voltage generated from the outside.

In the present invention, a power supply unit required by the TDI and the LDI when the LDI and the TDI are integrated into one IC is generated by a common power supply unit, and in this case, the TDI generates the common voltage, and the meaning that the magnitude of the common voltage is adjusted is the same meaning that one IC in which the TDI and the LDI are integrated performs the adjustment of the magnitude of the common voltage.

In addition, the above-mentioned common voltage is generated from a separate power management IC (PMIC) generating the AC input power, and the PMIC has a means for changing the magnitude of the common voltage. The PMIC has a means for alternating the AC voltage in synchronization with a control signal of the LDI or the TDI. For example, when the control signal output from the TDI is low, the PMIC may alternating Vc21, which is the AC voltage, from 10V, which is high, to 3V, on the basis of the earth ground, and when the control signal output from the PMIC is high (Hi), Vc21 may be swung from 3V to 10V. Of course, Vc22 may always maintain a constant DC voltage in synchronization with Vc21.

In a method for detecting a touch of a display device having an embedded touch sensor utilizing the common electrodes as the touch sensor according to an exemplary embodiment of the present invention, since the common electrodes connected to the SP or the NSP should not be changed, as in a method to be described below, a method for detecting a touch signal using the alternating driving voltage for the NSP, or a method for detecting a touch signal by applying the alternating driving voltage Cdrv in the TDI connected to the SP may be used.

In order to solve the above-mentioned problem, the present invention uses a method for detecting a touch signal using AC input power in addition to the method for detecting a touch signal using the common electrodes.

As described below, the TDI and the LDI may be integrated into one IC to be manufactured. In this case, as illustrated in FIG. 12, the AC power is not applied to the TDI and the LDI, respectively, but the AC input power will be applied to one integrated IC.

Referring to FIG. 21, FIG. 21 illustrates some function blocks of the TDI, which are illustrated in more detail in FIG. 9. Since the method for detecting a touch using the common electrodes according to an exemplary embodiment of the present invention uses the touch sensors embedded in the display device, in the case in which the TDI and the LDI use the common ground, the common voltage applied to the common electrodes, which are the touch sensors of the TDI may be operated as the common electrodes of the display device.

Therefore, the AC input power commonly having the ground is applied to the TDI, the LDI, or the common IC in which the TDI and the LDI are integrated, and the ground of the AC input power is Vc22. In the case in which it is assumed that Vcom is −2.2V on the basis of Vc22, which is the ground of the TDI or the LDI, when Vc22 is 10V on the basis of the earth ground, which is the absolute potential, Vcom is 7.8V on the basis of the earth ground.

Referring to FIGS. 9 and 21, since the ground of the TDI is Vc22, when the touch sensors which are the common electrodes operated as the SP are positioned in the display device, the parasitic capacitance occurs between the gate line 240 and the source lines 250 over or below the touch sensors, or when the G/L 295 exists between the touch sensors 10 and the driving signal lines, the parasitic capacitance also occurs between the touch sensors 10 and the G/L 295. In this case, the parasitic capacitance is modeled into Cvcom, when Cvcom overlaps with the signal line, VVcc is a potential of the signal line, and when Cvcom overlaps with the G/L, the potential of the G/L is VVcc. In addition, the parasitic capacitance also occurs between the NSP and the SP, which is represented by Cp, and since the potential of the NSP is Vcom, a ground of the Cp is Vcom.

In this structure, it is possible to detect the touch signal in synchronization with the rising edge or a falling edge of the alternating voltage when the AC input voltage is swung, and in this case, a detected signal is represented by the following Equation.

$$D/B = Vpre \pm Vswing \frac{Ct}{Cvcom + Cp + Ct} \quad \text{[Equation 5]}$$

Here, Ct is touch capacitance generated between the SP and the finger, and Vswing is magnitude of the alternating voltage that the AC input voltage having Vc22 as the ground is swung on the basis of the earth ground. Vpre is a voltage charged in the SP, which is Vcom. In addition, a positive or negative polarity after Vpre is interworked with the rising or the falling of the alternating voltage, the polarity when the alternating voltage falls is negative, and the polarity when the alternating voltage rises is positive. The above-mentioned rule is applied to the overall of the present specification.

The TDI calculates a change of magnitude of the voltage when Ct is added on the basis of when Ct does not exist in Equation 5 to calculate magnitude of Ct, thereby making it possible to confirm whether or not the touch is performed and to calculate a touched area.

When the touch signal is detected in synchronization with the rising edge or the falling edge of the alternating AC input voltage, some time is required until the touch signal is stabilized after the rising edge or the falling edge. This time may adjust a delay detection time by a setting means included in the TDI, for example, the setting of the resistor in the TDI.

FIG. 17 illustrates a display device having an embedded touch screen according to a third exemplary embodiment of the present invention. In FIG. 17, the touch sensors 10 are positioned on upper surfaces of the gate lines 240 and the source lines 250, and have a mesh structure as illustrated in FIG. 10. In an exemplary embodiment having this structure, the touch sensors 10 may be used in a transverse electric field mode such as an IPS mode, or the like, in which the common electrode of FIG. 6 is not present, or may be used in a state in which Vcom present in an area of the BM 130 between the RGB color filters 110 is removed by etching. However, connection points between the common electrodes 120 should remain in order to interconnect the common electrodes 120. The touch sensors 10 include the common electrodes 120 of FIG. 20.

The touch sensors 10 are installed above the gate lines 240 and the source lines 250, and are disposed at a width wider than those of the gate lines 240 and the source lines 250. In addition, the touch sensors 10 are formed in the mesh structure as illustrated in FIG. 10 or are formed in the matrix structure as illustrated in FIG. 9. In addition, in the case in which the touch sensors 10 are formed in the matrix structure as illustrated in FIG. 9, the touch sensors 10 may also be formed in a structure that is not the mesh structure, but may be formed in the mesh structure. As another example, in the case in which the touch sensors 10 are formed in the matrix structure, the touch sensors 10 are may be formed in a mixture structure of the mesh structure and a non-mesh structure. That is, some of the touch sensors 10 may not be formed in the mesh structure, and the other of the touch sensors 10 may be formed in the mesh structure. In addition, in the case in which the touch sensors 10 are formed in the matrix structure, it is preferable that the touch sensors 10 have areas that become small as they become close to the TDI 30.

In addition, it is preferable that the touch sensors 10 are disposed at positions adjacent to the pixel electrodes 230, are disposed so as not to overlap with the pixel electrodes 230 in the vertical direction, and are installed in the sub-pixel unit.

In addition, the number of sensor signal lines 22 connected to the touch sensors 10 is one or plural, and in the case in which the number of sensor signal lines 22 is plural, the sensor signal lines are bonded to each other in the A/A or are bonded to each other in the non A/A in which the TDI 30 is disposed.

In addition, the sensor signal lines 22 are installed above the gate lines 240 and the source lines 250, and include transparent wirings formed of at least one transparent conductive material such as indium tin oxide (ITO), antimony tin oxide (ATO), carbon nano tube (CNT), indium zinc oxide (IZO), nano wire, silver nano wire, or the like, and metal wirings formed of a metal. Here, it is preferable that the transparent wirings are formed in the A/A of the display device and the transparent wirings or the metal wirings are formed in the non A/A of the display device. Alternatively, the sensor signal lines 22 are not installed above the gate lines 240 and the source lines 250, but may be installed over the entire area of the display device, such as a pixel area of the display device.

In the case in which the touch sensors 10 are positioned on the upper surfaces of the gate lines 240 and the source lines 250 as described above, the BM 130 of the color filters 110 visually blocks the touch sensors 10 when the color filters 110 are coupled to the TFT substrate 210. Therefore, even though a metal is used as a material of the touch sensors 10, a flash phenomenon of the metal is not generated. Accordingly, the metal such as copper, aluminum, or the like, may be used as the material of the touch sensors 10, such that a resistance is reduced, thereby making it possible to more rapidly detect a touch signal and reduce a consumed current.

A protection layer may be added on upper surfaces of the touch sensors of FIG. 17, if necessary.

In a third exemplary embodiment of the present invention, the touch sensors 10 are applied with the alternating driving voltage generated from the TDI 30 or the AC alternating voltage generated from the PMIC, and the touch detecting unit 14 detects the touch signals in synchronization with a rising or falling edge of the AC alternating voltage.

In the display device having an embedded touch screen according to a third exemplary embodiment of the present invention, the touch sensors 10 positioned on the upper surfaces of the gate lines 240 and the source lines 250 malfunction by changes in voltages of the gate lines 240 and the source lines 250, and a display device having an embedded touch screen according to a fourth exemplary embodiment of the present invention further including a G/L 295 is suggested in order to solve this problem.

FIG. 18 is a view illustrating a display device having an embedded touch screen according to a fourth exemplary embodiment of the present invention. When the touch sensors 10 are positioned in any area of the active area of the display device or on upper surfaces of the gate lines 240 and the source lines 250, a G/L 295 is installed between the touch sensors 10 and the gate and source lines 240 and 250. Although an example in which the touch sensors 10 are installed on the upper surfaces of the gate lines 240 and the source lines 250 has been illustrated in FIG. 18, the touch sensors 10 may be disposed on any positions such as the gate lines 240, the source lines 250, and the like, except for upper surfaces of driving signal lines of the display device. In addition, this display device includes an AMOLED, a PMOLED, or the like, as well as an LCD.

Referring to FIG. 18, the touch sensors 10 are positioned on upper surfaces of TFTs constituting the display device, the first insulator 285 is positioned below the touch sensors 10, and the G/L 295 is positioned below the first insulator. It is preferable that the first insulator 285 is applied over the entire active area (A/A) of the display device.

The G/L 295 or the touch sensors 10 are positioned on the upper surfaces of the gate lines 240 and the source lines 250 or in any area of the A/A of the display device, are formed in the mesh structure as illustrated in FIG. 5 or is formed in a non-mesh structure as illustrated in FIG. 4, and a DC or alternating driving voltage is applied to the G/L 295.

All of the features of the present invention are similarly applied to the case in which the touch sensors 10 are positioned above the gate lines 240 and the source lines 250, similar to the display devices having an embedded touch screen according to the first and second exemplary embodiments corresponding to the case in which the touch sensors 10 are positioned below the signal lines.

After the touch sensors 10 are formed on the uppermost surface of FIG. 18, a second insulator 286 is not applied, which accomplishes a cost reducing effect. However, the second insulator 286 may be installed on upper surfaces of the touch sensors 10, if necessary.

In a fourth exemplary embodiment of the present invention, a method for applying the driving signal to the G/L 295 includes 1) a method for applying a DC voltage or an alternating voltage output from a TDI, and 2) a method for applying the same alternating voltage as the AC voltage applied to the TDI from a power management IC (PMIC), similar to the contents applied to the second exemplary embodiment.

In addition, it is preferable that the display device having an embedded touch screen according to a fourth exemplary embodiment of the present invention further includes a buffer or an operational amplifier (OPAMP) amplifying the driving signals of the TDI transferred to the G/L 295, similar to the display device having an embedded touch screen according to the second exemplary embodiment.

Further, in a fourth exemplary embodiment of the present invention, the touch sensors 10 are applied with the alternating driving voltage generated from the TDI 30 or the AC alternating voltage generated from the PMIC, and the touch detecting unit 14 detects the touch signals in synchronization with a rising or falling edge of the AC alternating voltage.

In addition, the same voltage as the AC alternating voltage synchronized at the time of detecting the touch signal by the touch detecting unit 14 is applied to the G/L.

The touch sensors 10 applied to the first to fourth exemplary embodiments of the present invention are formed in the mesh structure as illustrated in FIG. 10 or are formed in the matrix structure as illustrated in FIG. 9. In addition, in the case in which the touch sensors 10 are formed in the matrix structure as illustrated in FIG. 9, the touch sensors 10 may also be formed in a structure without having the mesh structure, but may be formed in the mesh structure. As another example, in the case in which the touch sensors 10 are formed in the matrix structure, the touch sensors 10 are may be formed in a mixture structure of the mesh structure and a non-mesh structure. That is, some of the touch sensors 10 may not be formed in the mesh structure, and the other of the touch sensors 10 may be formed in the mesh structure. In addition, in the case in which the touch sensors 10 are formed in the matrix structure, it is preferable that the touch sensors 10 have areas that become small as they become close to the TDI 30.

Meanwhile, in the case in which the size of the touch sensor according to the exemplary embodiment of the present is greater than the object such as the finger or the pen, it is impossible to accurately detect the touch position. Referring to FIG. 22, in the case in which the object such as the finger or the pen is moved in a vertical direction or a horizontal direction, it is impossible to calculate a touch coordinate when the object is moved within one touch sensor 10. In order to calculate the touch coordinate, area changes of two or more touch sensors need to occur.

A method for solving the above-mentioned problem includes sharing a touch sensor area in a longitudinal direction or a transversal direction by crossing two touch sensors. FIGS. 23A and 23B illustrate examples about a sharing of a touch sensor area according to an exemplary embodiment of the present invention, where the area is shared in a longitudinal direction. In FIGS. 23A and 23B, four touch sensors 10 formed in a quadrangular shape are present, and the respective touch sensors 10 share 50% up to the central portion of the touch sensors 10 adjacent to each other, that is, in a length direction. For example, a second sensor is changed to a triangle having a circular pattern, and shares an area between a first sensor and a third sensor by expanding own area as much as a length of 50% in the first and third sensors, that is, a length of the central portion of the touch sensors.

Therefore, a situation in which it is impossible to calculate a touch coordinate because an object moves only in one touch sensor even in the case in which the object vertically moves in one touch sensor in FIG. 22 so as not to cause the change of the area is changed to a situation in which it is possible to detect the touch because a change of the area in the two touch sensors occurs.

FIG. 23A illustrates a case in which a contact area is one when the touch sensors vertically contacts with each other, and in this case, a vertical displacement of a very small object may not be detected. In order to solve the above-mentioned problem, as illustrated in FIG. 23B, when the contact area of the touch sensors which are vertically positioned is increased to plural (e.g., three in the example), that is, the number of vertexes which vertically overlap with each other is increased, the area sharing between the touch sensors closely occurs, thereby making it possible to easily detect a change of the object having a small area.

In this case, the number of vertexes overlapping with each other necessarily includes a half vertex such as 1.5, or 2.5, or 3.5, so the contact areas overlapped between the objects are the same as each other, such that the parasitic capacitance generated between the touch sensors is equal to each of the touch sensors. A concept of the half vertex was used in an aspect in which an area of a right triangle of an upper end touch sensor sharing the area in a zigzag is just 50% of an area of a neighboring triangle thereof, and an area of a left triangle of a lower side touch sensor is also just 50% of an area of a neighboring triangle thereof, with reference to FIG. 23B.

In addition, one sensor simultaneously shares the area in an upper side and a lower side facing each other, and a length of the area sharing is minimum 0% (not share the area) to maximum 50%.

FIG. 24 illustrates an example in which the touch sensors in the transversal direction share the area. Similar to the example in the longitudinal direction, the touch sensors which are left and right in the transversal direction share the area, and share the area as much as a length of 0 to 50%. The overlapping vertexes preferably include the half vertex such as 2.5 or 3.5. Although not illustrated, the signal lines disposed in a vertical direction also have a zigzag shape.

FIG. 25 is a view of an example in which the area up and down or left and right areas of the touch sensors are shared in a case in which the touch sensors are positioned on upper surfaces or lower surfaces of gate lines or source lines according to an exemplary embodiment of the present invention. Referring to FIG. 25, an upper side touch sensor and a lower side touch sensor share the area, an interval between the touch sensors at the time of sharing the area is illustrated. A lattice of FIG. 25 indicates a pixel of the display device, solid lines in the longitudinal direction are the gate lines 240, and solid lines in the transversal direction is the source lines 250.

As such, when the touch sensors are present on the upper surfaces or the lower surfaces of the signal lines, the touch sensors share the area in a step shape in a unit of pixel. This is also equally applied to the area sharing of the sensors disposed in the transversal direction or the area sharing of the sensors disposed in the longitudinal direction.

The interval between the sensors is at least one pixel or more. If the common electrodes serving as the touch sensors in the unit of pixel share the area as in FIG. 23 or 24 in an exemplary embodiment of the present invention sharing the touch sensors with the common electrodes, the pixels to which the common electrodes are not applied occur, thereby causing defect of quality of image.

FIG. 26 illustrates an example of a sharing of a touch sensor area in a case in which the common electrodes act as the touch sensors. Referring to FIG. 26, the source lines 250 in the longitudinal direction and the gate lines 240 in the transversal direction are present, and the area sharing occurs at the driving signal lines as a boundary. That is, in the case in which the common electrodes act as the touch sensors, different touch sensors 10c and 10d are divided at the source lines 250 or the gate lines 250 as the boundary in order to prevent a situation in which the common electrodes are not applied to separate pixels.

Alternatively, in the case in which process capability of an equipment in a process of manufacturing the LCD is good, different touch sensors may be divided from the upper surfaces or the lower surfaces of the signal lines.

In the display device including the touch screen according to an exemplary embodiment of the present invention, the LCD driving IC (LDI) and a touch driving IC (TDI) should be used. The LDI and the TDI are divided to be separately used as illustrated in FIG. 12, but in this case, a process of manufacturing the LDI and the TDI is added, thereby increasing production costs. In addition, when the IC is disposed at one side of the display device in FIG. 16, a space may be increased. In order to solve the above-mentioned problems, the present invention suggests a method in which two ICs are integrated into one IC.

FIG. 27 illustrates a structure of an IC in which an LDI and a TDI are integrated into one according to an exemplary embodiment of the present invention. Referring to FIG. 27, an area 1 and an area 3 are the TDI, in which the components of FIG. 9 are divided to be distributed, or are included in the area 1 and the area 3, respectively. Alternatively, an area 2 is the TDI, and the components of the TDI of FIG. 9 are all included in the area 2.

In addition, the area 2 is an LDI area. The LDI may be positioned at the central portion of the integrated IC, or may be disposed at the position of the area 1 or the area 3.

As such, if the TDI and the LDI are integrated into one IC, the power generated from the TDI or the LDI may be shared, and since one of the power of the LDI and the power of the TDI may be deleted, an area of the IC is decreased, thereby reducing the costs.

In this case, since the signal needs not to be transmitted between the TDI and the LDI, the TDI and the LDI need not to be connected to each other through the signal in the IC, but the TDI and the LDI may share the necessary signal in the IC, if necessary.

In the display device having an embedded touch screen according to an exemplary embodiment of the present invention, the touch sensor and the sensor signal line are formed to be positioned on the same line as the driving signal line such as the source line, the gate line, or the like, of the display device, to prevent the touch sensor and the sensor signal line from being observed in the display device and remove an influence of the touch sensor and the sensor signal line on the display device.

In addition, a recognition error of the touch signal due to disconnection of the sensor signal line may be prevented, such that touch recognition performance of the touch device may be stably maintained.

Further, the guard layer (G/L) is installed to reduce the parasitic capacitance generated between the touch sensor and the sensor signal line and components of the display device, thereby easily obtaining the touch signal.

Further, the touch sensitivity may be improved by applying a method for applying a DC voltage or an alternating voltage output from a TDI and a method for applying the same alternating voltage as an AC voltage applied to the TDI from a power management IC (PMIC), respectively, to a guard layer.

Further, the sensor signal line is used together with the source metal and the gate metal used in the display device in an area except for the active area (A/A) of the display device to reduce a resistance of the sensor signal line, thereby easily detecting the obtained touch signal.

It will be obvious to those skilled in the art to which the present invention pertains that the present invention is not limited to the above-mentioned exemplary embodiments and the accompanying drawings, but may be variously substituted, modified, and altered without departing from the scope and spirit of the present invention.

What is claimed is:

1. A display device having an embedded touch screen, the display device comprising:
   a substrate on which pixel electrodes, driving signal lines, and common electrode signal lines are disposed, wherein each of common electrodes is formed by electrically connecting two or more common electrode signal lines, wherein the common electrodes are disposed above or below the pixel electrodes, wherein the display device further comprises a plurality of touch sensors, each of the touch sensors being comprised of two or more common electrodes, such that said each of the touch sensors is comprised of four or more common electrode signal lines, and wherein the four or more common electrode signal lines are coupled and electrically connected to each other between common electrode signal lines of different pixel electrodes.

2. The display device of claim 1, further comprising a plurality of sensor signal lines electrically connecting the touch sensors configured by electrically connecting two or more common electrodes to each other to a touch drive IC.

3. The display device of claim 2, wherein the sensor signal lines are configured by electrically connecting one or more common electrodes to each other.

4. The display device of claim 2, wherein the sensor signal lines are formed of a transparent conductive material or an opaque metal material, and are disposed on the same lines which are perpendicular to the driving signal lines.

5. The display device of claim 2, wherein the touch drive IC drives the touch sensors configured by electrically connecting two or more common electrodes, during a poach period of the pixel electrodes.

6. The display device of claim 1, wherein the common electrodes are disposed above the pixel electrodes, and
an insulating layer is disposed between the common electrodes and the pixel electrodes.

7. The display device of claim 1, wherein a guard layer is disposed between the common electrodes and the pixel electrodes.

8. The display device of claim 7, wherein the guard layer is divided to be overlapped with the touch sensors configured by electrically connecting two or more common electrodes in one-to-one scheme.

9. The display device of claim 8, wherein among the touch sensors configured by electrically connecting two or more common electrodes,
the guard layer overlapped with a first touch sensor detecting a touch is applied with a first voltage, and
the guard layer overlapped with a second touch sensor that does not detect the touch is applied with a second voltage.

10. The display device of claim 9, wherein the first voltage is an alternating voltage or a precharge voltage,
the second voltage is a DC voltage or a ground voltage, and
the first voltage and the second voltage are supplied from a touch drive IC or a power management IC.

11. A method for detecting a touch of a display device having an embedded touch screen, the display device including a plurality of touch sensors and a substrate on which pixel electrodes, driving signal lines, and common electrode signal lines are disposed, each of common electrodes being formed by electrically connecting two or more common electrode signal lines, the common electrodes being disposed over or below the pixel electrodes, each of the touch sensors being comprised of two or more common electrodes, such that said each of the touch sensors is comprised of four or more common electrode signal lines, the four or more common electrode signal lines being coupled and electrically connected to each other between common electrode signal lines of different pixel electrodes, the method comprising:
generating touch signals using the touch sensors; and
detecting the touch by receiving the generated touch signals through sensor signal lines.

12. The method of claim 11, wherein the sensor signal lines electrically connect the touch sensors configured by electrically connecting two or more common electrodes to each other to a touch drive IC.

13. The method of claim 12, wherein the sensor signal lines are configured by electrically connecting one or more common electrodes to each other.

14. The method of claim 12, wherein the sensor signal lines are formed of a transparent conductive material or an opaque metal material, and are disposed on the same lines which are perpendicular to the driving signal lines.

15. The method of claim 12, wherein the touch drive IC drives the touch sensors configured by electrically connecting two or more common electrodes, during a poach period of the pixel electrodes.

16. The method of claim 11, wherein the common electrodes are disposed above the pixel electrodes, and
an insulating layer is disposed between the common electrodes and the pixel electrodes.

17. The method of claim 11, wherein a guard layer is disposed between the common electrodes and the pixel electrodes.

18. The method of claim 17, wherein the guard layer is divided to be overlapped with the touch sensors configured by electrically connecting two or more common electrodes in one-to-one scheme.

19. The method of claim 18, wherein among the touch sensors configured by electrically connecting two or more common electrodes,
the guard layer overlapped with a first touch sensor detecting a touch is applied with a first voltage, and
the guard layer overlapped with a second touch sensor that does not detect the touch is applied with a second voltage.

20. The method of claim 19, wherein the first voltage is a alternating voltage or a precharge voltage,
the second voltage is a DC voltage or a ground voltage, and
the first voltage and the second voltage are supplied from a touch drive IC or a power management IC.

\* \* \* \* \*